US011341302B1

(12) United States Patent
Neacsu et al.

(10) Patent No.: US 11,341,302 B1
(45) Date of Patent: May 24, 2022

(54) METHOD FOR TRANSLATION OF ANALOG CIRCUIT NETLIST TO A DIGITAL MODEL AND ELIMINATION OF ZERO DELAY LOOPS WITHIN THE DIGITAL MODEL

(71) Applicant: Infineon Technologies AG, Neubiberg (DE)

(72) Inventors: Cristian Neacsu, Buchare (RO); Gabriela Solomon, Com. Albestii de Muscel (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/130,429

(22) Filed: Dec. 22, 2020

(51) Int. Cl.
| | |
|---|---|
| *G06F 30/323* | (2020.01) |
| *G06F 30/30* | (2020.01) |
| *G06F 30/3308* | (2020.01) |
| *G06F 30/33* | (2020.01) |
| *G06F 30/38* | (2020.01) |
| *G06F 119/12* | (2020.01) |
| *G06F 30/3312* | (2020.01) |

(52) U.S. Cl.
CPC ............ *G06F 30/323* (2020.01); *G06F 30/33* (2020.01); *G06F 30/3308* (2020.01); *G06F 30/38* (2020.01); *G06F 30/3312* (2020.01); *G06F 2119/12* (2020.01)

(58) Field of Classification Search
CPC ... G06F 30/30–398; G06F 2111/00–20; G06F 2113/00–20; G06F 2115/00–12; G06F 2117/00–12; G06F 2119/00–22
See application file for complete search history.

(56) References Cited

PUBLICATIONS

Middlebrook, R.D. "Measurement of Loop Gain in Feedback Systems"; Int. J Electronics, Apr. 1975, vol. 38, No. 4, pp. 485-512.
IEEE Standards Association; IEE Std 1800-2012, "IEEE Standard for SystemVerilog—Unified Hardware Design, Specification, and Verification Language".
Cummings, Clifford E. et al.; "SystemVerilog Event Regions, Race Avoidance & Guidelines"; Sunburst Design; Rev. 1.2; SNUG; Boston 2006, pp. 1-42.
Zhang, Yan et al.; "Piecewise Linear Modeling of Nonlinear devices for Formal Verification of Analog Circuits" University of Colorado, Boulder CO; Proceedings of the 12th Conference on Formal Methods in Computer-Aided Design (FMCAD); 2012; pp. 196-203.
Wikipedia; "SPICE"; https://en.wikipedia.org/wiki/SPICE; Last Edit: Dec. 20, 2020.

(Continued)

*Primary Examiner* — Leigh M Garbowski
(74) *Attorney, Agent, or Firm* — Eschweiler & Potashnik, LLC

(57) ABSTRACT

An analog circuit netlist translation system is disclosed. The analog circuit netlist translation system comprises a model translation module configured to receive an analog circuit netlist; and transform the analog circuit netlist into a digital model. In some embodiments, the digital model comprises a set of zero-delay loops. The analog circuit netlist translation system further comprises a translation methodology module configured to determine a set of closed loop values respectively associated with the set of zero-delay loops, in order to eliminate the set of zero-delay loops within the digital model. In some embodiments, the set of closed loop values are determined by the translation methodology module in a single timeslot.

20 Claims, 9 Drawing Sheets

(56) References Cited

PUBLICATIONS

Wikipedia; "Electronic Circuit Simulation"; https://en.wikipedia.org/wiki/Electronic_circuit_simulation; Last Edit: May 27, 2020.
Wikipedia; "Netlist"; https://en.wikipedia.org/wiki/Netlist; Last Edit: Feb. 2, 2020.
Wikipedia; "Functional verification"; https://en.wikipedia.org/wiki/Functional_verification; Last Edit:Apr. 10, 2020.
Semiengineering.com; "Functional Verification"; https://semiengineering.com/knowledge_centers/eda-design/verification/functional-verification/; Sep. 10, 2015, 8 pages.
Sciencedirect.com; "Functional Verification"; https://www.sciencedirect.com/topics/computer-science/functional-verification, in Top-Down Digital VLSI Design, 2015, pp. 1-16.

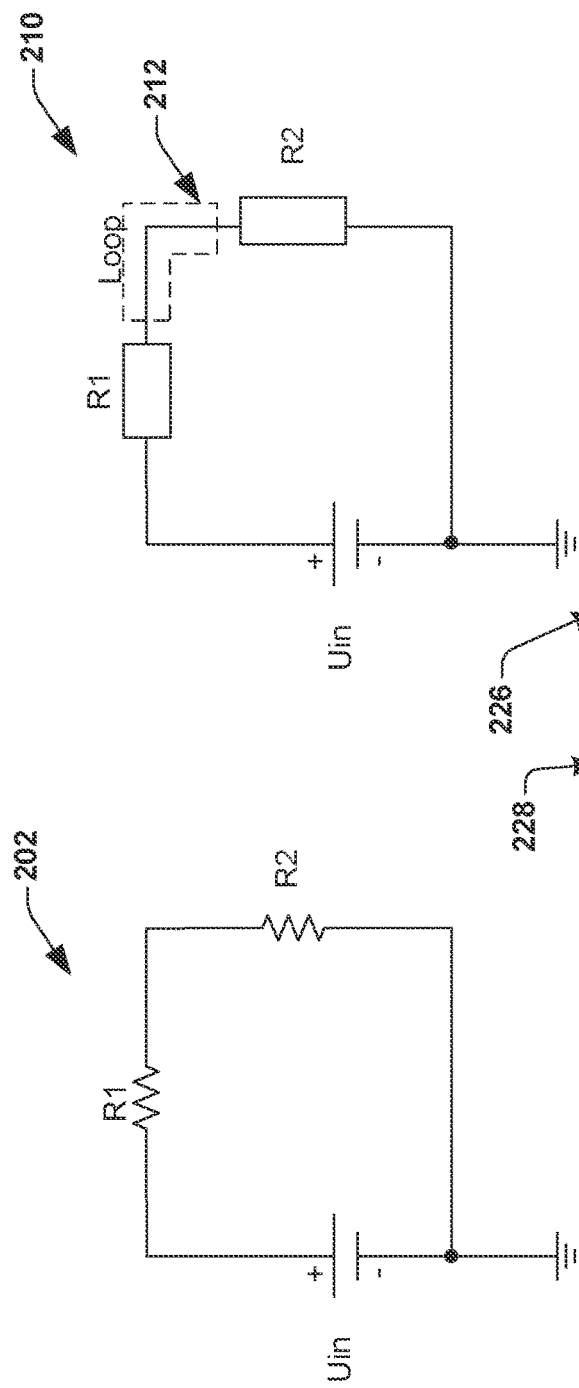
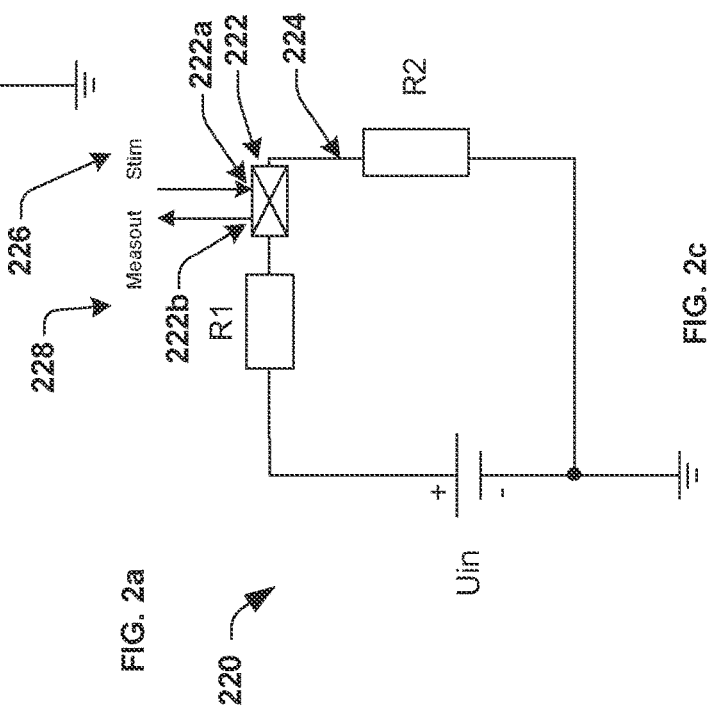
FIG. 2a
FIG. 2b
FIG. 2c

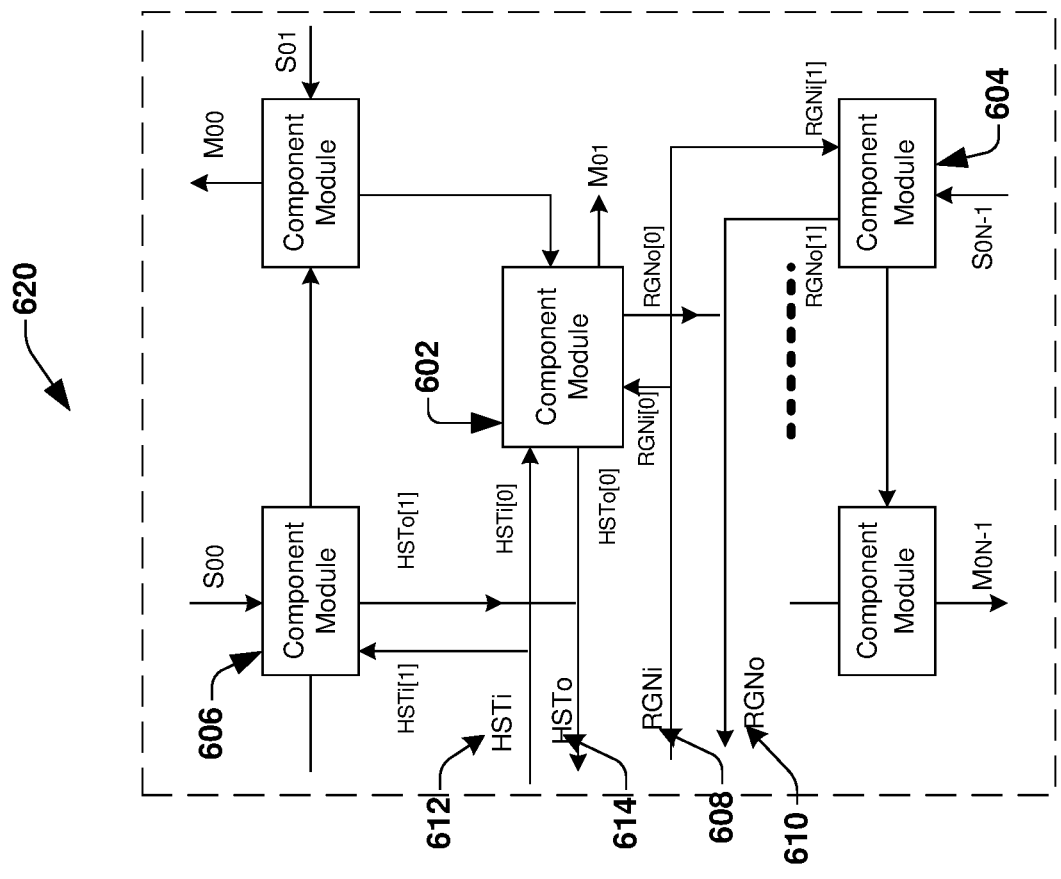
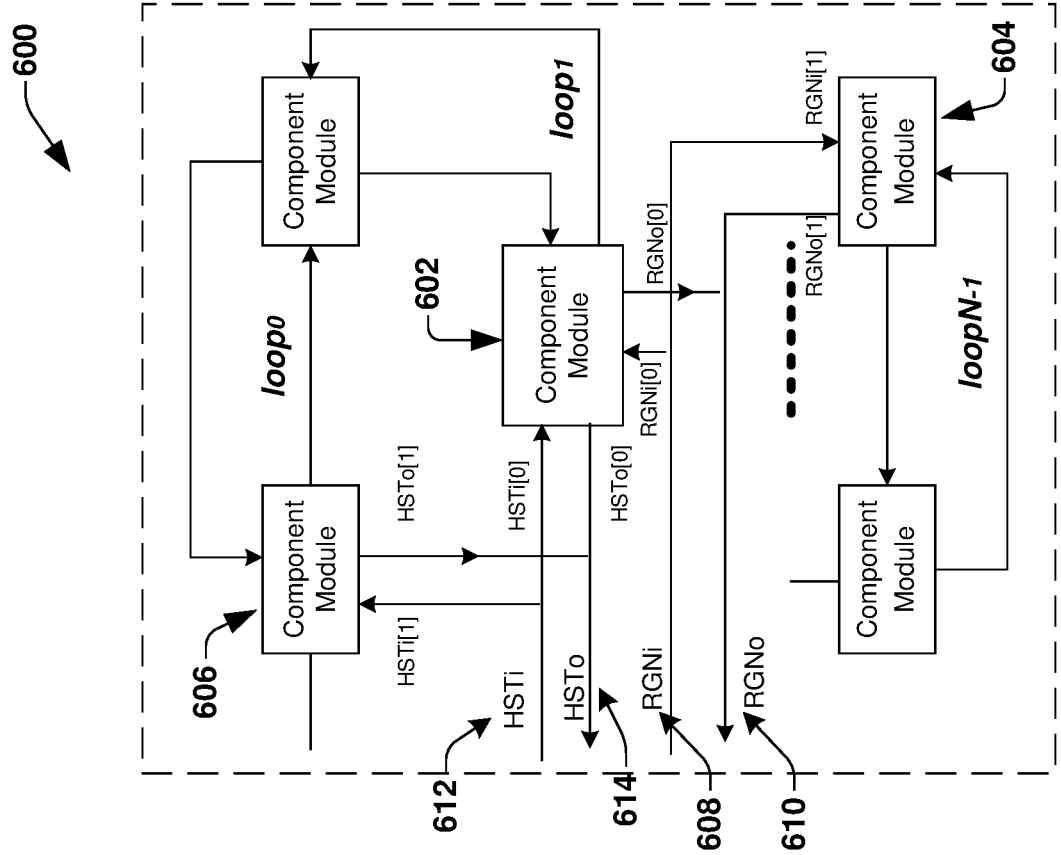
FIG. 6a
FIG. 6b

METHOD FOR TRANSLATION OF ANALOG CIRCUIT NETLIST TO A DIGITAL MODEL AND ELIMINATION OF ZERO DELAY LOOPS WITHIN THE DIGITAL MODEL

FIELD

The present disclosure relates to translation of analog circuit netlists, and in particular, to a system and method for translation of an analog circuit netlist into a digital model and eliminating zero-delay loops within the digital model.

BACKGROUND

Silicon chip technology powers many of today's innovations and newest products. Rapid technology advancement fuels ever-increasing chip complexity, which in turn enables the latest round of amazing products. Expectations for these chips grow at an equal rate, despite the additional complexity. For example, consumers do not expect the chips that monitor safety processes in our cars to fail during the normal life of the vehicle. Thus, it has become a major engineering feat to design these silicon chips correctly. Functional verification ensures that the design performs the tasks as intended by the overall system architecture. Functional verification is the process of demonstrating the functional correctness of a design with respect to the design specifications. Functional verification is a very important aspect in integrated circuit (IC) design cycle. It is imperative that the design is functionally verified and any potential bug is eliminated at an early stage.

BRIEF DESCRIPTION OF THE DRAWINGS

Some examples of circuits, apparatuses and/or methods will be described in the following by way of example only. In this context, reference will be made to the accompanying Figures.

FIG. 2a illustrates an example implementation of an analog circuit netlist of a voltage divider circuit, according to one embodiment of the disclosure.

FIG. 2b illustrates a digital model of the voltage divider circuit, according to one embodiment of the disclosure.

FIG. 2c illustrates a digital model with a loop breaking point added in the circuit path associated with the zero-delay loop, according to one embodiment of the disclosure.

FIG. 6a illustrates a digital model with N zero-delay loops that comprises non-linear components, according to one embodiment of the disclosure.

FIG. 6b illustrates a digital model comprising non-linear components with the zero-delay loops opened to form input break points and output break points, in order to determine the set of closed loop (CL) values, according to one embodiment of the disclosure.

DETAILED DESCRIPTION

Figure 1:
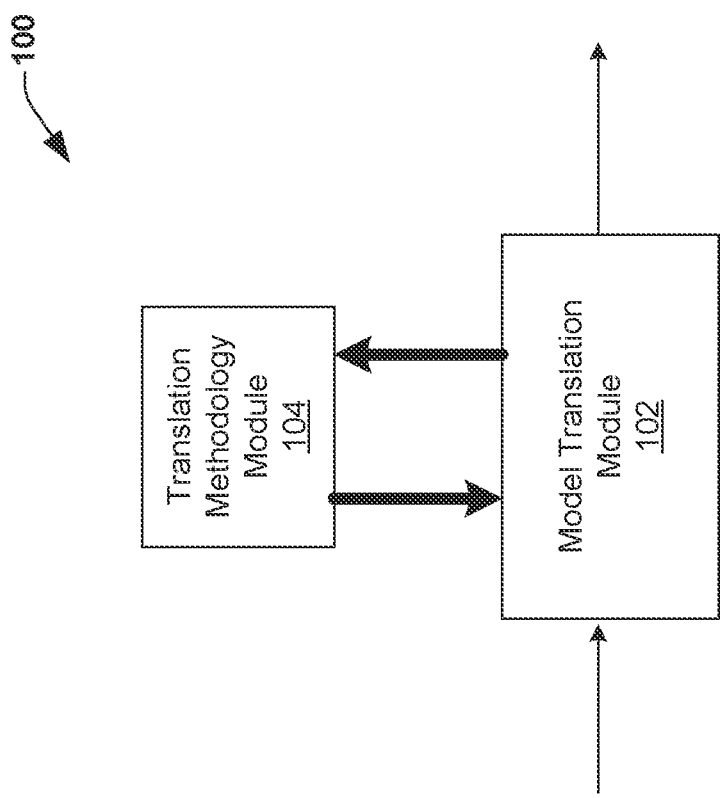
FIG. 1 illustrates a simplified block diagram of an analog circuit netlist translation system, according to one embodiment of the disclosure.

In one embodiment of the disclosure, an analog circuit netlist translation system is disclosed. The analog circuit netlist translation system comprises a model translation module configured to receive an analog circuit netlist; and transform the analog circuit netlist into a digital model. In some embodiments, the digital model comprises a set of zero-delay loops. The analog circuit netlist translation system further comprises a translation methodology module configured to determine a set of closed loop values respectively associated with the set of zero-delay loops, in order to eliminate the set of zero-delay loops within the digital model. In some embodiments, the set of closed loop values are determined by the translation methodology module in a single timeslot.

In one embodiment of the disclosure, at least one computer-readable storage medium comprising a set of instructions to be executed on an analog circuit netlist translation system is disclosed. The instructions, in response to being executed on the analog circuit netlist translation system, cause the analog circuit netlist translation system to perform operations comprising receiving an analog circuit netlist and transforming the analog circuit netlist into a digital model. In some embodiments, the digital model comprises a set of zero-delay loops. The operations further comprise determining a set of closed loop values respectively associated with the set of zero-delay loops, in order to eliminate the set of zero-delay loops within the digital model. In some embodiments, the set of closed loop values are determined in a single timeslot.

In one embodiment of the disclosure, a method for an analog circuit netlist translation system is disclosed. The method comprises receiving an analog circuit netlist model using a model translation module and transforming the analog circuit netlist into a digital model using the model translation module. In some embodiments, the digital model comprises a set of zero-delay loops. The method further comprises determining a set of closed loop values respectively associated with the set of zero-delay loops using a translation methodology module, in order to eliminate the set of zero-delay loops within the digital model. In some embodiments, the set of closed loop values are determined by the translation methodology module in a single timeslot.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit", "module" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, functional verification is a very important aspect in integrated circuit (IC) design cycle. The industry universal solution to speed-up the design simulation at functional verification side is to use a digital engine instead of analog (SPICE) one—this means going from matrix based paradigm to event driven paradigm. In the process of functional verification of a mixed-signal product/design, therefore, it is often required develop an abstract view or a digital model of the product/design, in order to shorten the simulation time and make feasible a large number of tests. In some embodiments, the abstract view or digital model refers to a digital engine specific view/model of the design that can be simulated on a digital engine or an event driven engine. In some embodiments, the abstract view is further referred to as a behavioral model. The modeling process is not a trivial one and depends on a number of factors: complexity of the design, target of the verification, feature set required, verification domain, simulator engine involved. In some embodiments, the abstract view or the digital model is developed from a references view or an analog circuit netlist of the product/design, based on translating/transforming the analog circuit netlist into a digital domain compatible version. In some embodiments, the analog circuit netlist (also referred to as an analog model) comprises a list of the analog components in a circuit and a list of the nodes they are connected to. In some embodiments, the digital model comprises a digital equivalent of the analog circuit netlist. The abstract view or the digital model run much faster than the full analog view (or analog circuit netlist) but preserve the desired original behavior. In some embodiments, the digital model can comprise an equivalent code, sometimes referred to herein as real number modeling (RNM) code.

The model development has specific difficulty since the simulation engines are different between the references view (analog circuit netlist—analog engine specific) and abstract view (digital model/netlist—digital engine specific). The difficulty arises due to the fact that the analog description/model (or the analog circuit netlist) contains naturally zero delay loops which are automatically processed by the matrix-based engines (analog engines)—but cannot be directly processed by event driven engines (digital engines). Zero delay loop means that there are some signals that have intermingled dependency between them (forming loops with no delay on the path) within the circuit and a directional cause-effect behavior cannot be assigned between them. The analog engine (matrix based) is mathematically built to solve such situations where signals deeply depend on one another. The event driven engine, however, is fundamentally based on cause-effect flow, or unidirectionality from input to output. Therefore, when the digital model is developed based on a translation (e.g., a 1:1 translation) of the analog circuit netlist, the digital model may contain zero-delay loops, which may not be processed by digital engines, or which when processed by even-driven engines may lead to unreliable results. Therefore, it is essential to develop digital models without zero-delay loops.

Currently different techniques are used in order to translate analog circuit netlist (references view) to digital models (or abstract view) without zero-delay loops, but all requires high percentage of manual effort. For example, in one embodiment, each circuit of the analog circuit netlist is separately analyzed manually and a symbolic formula is extracted, which is put in code (e.g., the RNM code). However, this requires skilled human intervention which is prone to error and time consuming. In another embodiment, the zero-delay topology of the digital netlist (e.g., obtained by a 1:1 translation of the analog circuit netlist) is manually converted into another equivalent or almost equivalent topology that does not have zero-delay loops and continue with an automated procedure that produces the code (e.g., the RNM code). However, such a conversion is not trivial and is usually complex. In yet another embodiment, the accuracy is drastically reduced and only basic behavior of the analog circuit netlist is manually modeled. However, such models have limited usage due to basic behavior. Further, all the above methods are done by someone with digital language knowledge and usually is not the original analog circuit designer. In order to overcome the above disadvantages, disclosed herein is a system and a method to develop an event-driven model (and/or a corresponding RNM code) based on an automatic translation of an analog piecewise linear (PWL) circuit or analog circuit netlist, further details of which are given in embodiments below. In some embodiments, the event-driven model comprises a digital engine specific model or digital model that does not include zero-delay loops.

FIG. 1 illustrates a simplified block diagram of an analog circuit netlist translation system 100, according to one embodiment of the disclosure. In some embodiments, the analog circuit netlist translation system 100 is configured to translate an analog circuit netlist into an event driven model. In some embodiments, the event driven model comprises a digital engine specific model that is compatible with digital simulation engines. In some embodiments, the analog circuit netlist translation system 100 may be part of a simulation engine (e.g., a digital simulation engine). The analog circuit netlist translation system 100 comprises a model translation module 102 and a translation methodology module 104. The model translation module 102 is configured to receive an analog circuit netlist associated with an electronic circuit/design. In some embodiments, the analog circuit netlist comprises two or more analog components that are interconnected to one another using analog connections.

Upon receiving the analog circuit netlist, the model translation module 102 is configured to transform the analog circuit netlist to a digital model (or digital netlist). In some embodiments, the analog circuit netlist is transformed into the digital model (or digital netlist) based on replacing analog components in the analog circuit netlist with their equivalent digital domain components, and maintaining digital domain connections between the digital domain components similar to the analog connections in the analog circuit netlist (e.g., a 1:1 translation of analog components to digital domain components). In some embodiments, the digital domain connections refer to interconnections between digital domain components in a digital netlist. In some embodiments, the digital model comprises zero-delay loops. As explained above, zero delay loop means that there are some signals that have intermingled dependency between them (forming loops with no delay on the path) within the circuit and a directional cause-effect behavior cannot be assigned between those signals.

Figures 3A, 3B:
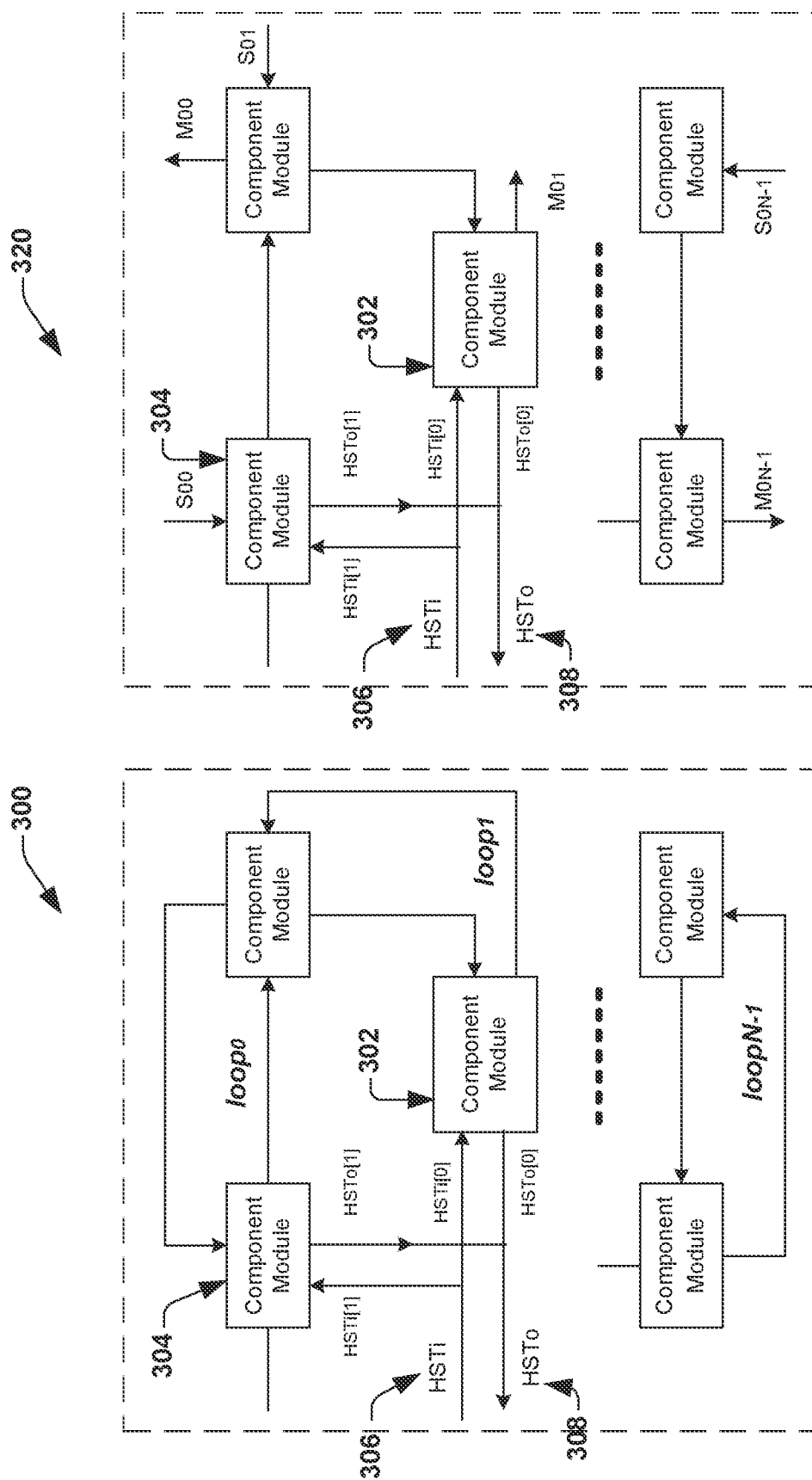
FIG. 3a illustrates an example implementation of a digital model comprising N loops, loop0, loop1 . . . loop N–1, according to one embodiment of the disclosure.
FIG. 3b illustrates a digital model with the zero-delay loops opened to form input break points and output break points, in order to determine the set of closed loop (CL) values.

FIG. 2a illustrates an example implementation of an analog circuit netlist 202 of a voltage divider circuit, according to one embodiment of the disclosure. FIG. 2b illustrates a digital model 210 of the voltage divider circuit, according to one embodiment of the disclosure. In some embodiments, the digital model 210 is formed by transforming the analog circuit netlist 202 into digital domain. As can be seen, the digital model 210 comprises a zero-delay loop 212. The zero-delay loop 212 is formed due to the intermingled dependencies of signals (voltage and/or current) in the circuit path between R1 and R2. The digital model 210 in FIG. 2b is shown to include only a single zero-delay loop 212. In other embodiments, however, a digital model of a circuit can comprise a set of zero-delay loops. In some embodiments, the set of zero-delay loops comprises N loops, where N is any real number greater than zero. For example, FIG. 3a illustrates an example implementation of a digital model 300 comprising N loops, loop0, loop1 . . . loop N−1. The component modules depicted in FIG. 3a are coupled to one another using digital domain connections. Further, each component module in the digital model 300 may comprise one or more digital domain components that are coupled to one another. Due to the presence of the zero-delay loops (e.g., the zero-delay loop 212 in FIG. 2b), the digital model 210 in FIG. 2b or the digital model 300 in FIG. 3a may not be processed by digital engines (or event driven engines), or when processed by event-driven engines (or digital engines) may lead to unreliable results. Therefore, it is essential to eliminate the zero-delay loop (s) from the digital model 210 and/or the digital model 300.

In order to eliminate the zero-delay loop(s), in some embodiments, closed loop (CL) value(s) associated with the zero-delay loop(s) is to be determined. In some embodiments, the translation methodology module 104 is configured to determine the closed loop (CL) value(s) for the zero-delay loop (s) associated with digital models, further details of which are given below. In particular, when the digital model comprises a set of zero-delay loops (e.g., as in the case of the digital model 300 in FIG. 3a), the translation methodology module 104 is configured to determine a set of CL values respectively associated with the set of zero-delay loops. Prior to determining the closed loop value(s) associated with the zero-delay loop(s) by the translation methodology module 104, in some embodiments, the model translation module 102 is configured to identify the location of the zero-delay loop(s) within the digital model. Upon determining the location of the zero-delay loop(s), the model translation module 102 is further configured to determine/add a loop breaking point in a circuit path (i.e., the digital domain connection) associated with each of the zero-delay loop.

For example, as can be seen in FIG. 2c, the model translation module 102 is configured to add a loop breaking point 222 in the circuit path 224 associated with the zero-delay loop 212. In particular, FIG. 2c illustrates a digital model 220 (equivalent to the digital model 210 in FIG. 2b) with a loop breaking point 222 added in the circuit path 224 associated with the zero-delay loop 212, according to one embodiment of the disclosure. Similarly, when the digital model comprises a plurality of zero-delay loops (e.g., the digital model 300 in FIG. 3a), the model translation module 102 may be configured to add loop breaking points in the circuit paths associated with each of the zero-delay loops. Referring to FIG. 2c, in some embodiments, the loop breaking point 222 is realized by breaking/cutting a voltage line/current line of the digital domain connection that constitutes the circuit path 222 associated with the zero-delay loop 212, to form two ends, a first end comprising an input break point 222a and a second end comprising an output break point 222b. In some embodiments, the input break point 222a is further referred to as a loop input and the output break point 222b is further referred to as a loop output. In some embodiments, the digital domain connections between digital domain components associated with any digital netlist comprises a voltage line and/or a current line.

In some embodiments, the input break point 222a and the output break point 222b are formed, in order to determine a CL value for the zero-delay loop 212. In some embodiments, the zero-delay loop 212 will be eliminated when an input stimulus value (voltage or current) equal to the CL value is inserted at the input break point 222a. In some embodiments, the CL value when inserted at the input break point 222a would generate a response value equal to the CL value at the output break point 222b, thereby eliminating the effect of the zero-delay loop 212. In some embodiments, a response value (voltage or current) measured at the output break point 222b will be equal to the input stimulus value inserted at the input break point 222a only when the stimulus value inserted at the input break point 222a is equal to the CL value. When there are multiple zero-delay loops (e.g., as in the digital model 300), the model translation module 102 is configured to determine a respective CL value for each zero-delay loop of the multiple zero-delay loops.

In some embodiments, the translation methodology module 104 is configured to compute the CL value for the zero-delay loop 212 based on a plurality of stimuli values 226 (e.g., voltages or currents) that are provided at the input break point 222a and a corresponding plurality of measured output values 228 (e.g., voltages or currents) determined based on measurements from the output break point 222b (in response to providing the stimuli values 226 at the input break point 222a), as can be fully appreciated from the explanations below. In some embodiments, each measured output value 228 corresponds to a difference between a response value (voltage/current) that is measured at the output break point 222b (or the loop output) in response to providing the stimulus value 226 at the input breakpoint 222a and the stimulus value 226 provided at the input break point 222a (or the loop input).

Although, the explanation above is provided with respect to the zero-delay loop 212, the model translation module 102 is configured to determine loop breaking points in a similar fashion for all the zero-delay loops in digital models comprising a set of zero-delay loops (e.g., the digital model 300 in FIG. 3a). In particular, FIG. 3b illustrates a digital model 320 (similar to the digital model 300 in FIG. 3a) with the zero-delay loops opened to form input break points and output break points, in order to determine the set of closed loop (CL) values. In such embodiments, the translation methodology module 104 is configured to determine the set of closed loop values respectively associated with the set of zero-delay loops based on input stimuli values (e.g., $S_{00}$, $S_{01}$, ... $S_{0N-1}$ in FIG. 3b) provided at input break points of circuit paths associated with the set of zero-delay loops and output measurement values ($M_{00}$, $M_{01}$ ... $M_{0N-1}$ in FIG. 3b) determined based on measurements from output break points of the circuit paths, as can be fully appreciated in embodiments below.

In order to derive a relation for computing the CL value, in some embodiments, the zero-loop behavior for a model with a single zero-delay loop is described using a first order equation with two unknown values $\alpha$ and $\beta$, as given below:

$$Meas_{out} = \alpha \cdot stim + \beta \quad (1)$$

Where stim is the stimulus value (e.g., the stimulus value 226 in FIG. 2c) provided at the input break point associated with the zero-delay loop and $Meas_{out}$ is a measured output value (e.g., the measured output value 228 in FIG. 2c) that corresponds to a difference between a response value measured at the output break point (or the loop output) in response to providing the stimulus value at the input break-point and the stimulus value provided at the input break point (or the loop input). The closed loop (CL) value associated with a zero-delay loop is determined considering that a CL value inserted at the input breakpoint 222a (in place of the stimuli value) generates a measured output value equal to zero. In other words, the CL value comprises a value which when inserted at the input break point (i.e., the loop input) gives a response equal to the CL value at the output break point (i.e., the loop output), thereby giving a measured output value $Meas_{out}$ of zero. Therefore, in some embodiments, providing the CL value to the input break point (or the loop input) eliminates the effect of the zero-delay loops in digital models (e.g., the digital model 210 in FIG. 2a or the digital model 300 in FIG. 3a). Accordingly, based on the above consideration, the CL value is determined based on equation below:

$$\alpha \cdot CL + \beta = 0 \quad (2)$$

In order to determine the values of $\alpha$ and $\beta$, in the case of a single zero-delay loop, two values of stimuli and measured output values are required. Therefore, the plurality of stimuli values 226 in FIG. 2c comprises 2 stimulus values and the plurality of measured output values 228 in FIG. 2c comprises 2 measured output values. In such embodiments, the values of $\alpha$ and $\beta$ can be determined based on equations (3) and (4) below:

$$M_{00} = \alpha \cdot S_{00} + \beta \quad (3)$$

$$M_{10} = \alpha \cdot S_{10} + \beta \quad (4)$$

Where $M_{00}$ and $M_{10}$ are measured output values (equivalent to $Meas_{out}$ in equation (1) above) measured when stimuli $S_{00}$ and $S_{10}$ are applied, and $\alpha$ and $\beta$ are two unknown parameters.

The closed loop result (CL) is calculated as:

$$\alpha \cdot CL + \beta = 0 \rightarrow CL = -\beta/\alpha \quad (5)$$

Extracting $\alpha$ and $\beta$ from equations (3) and (4), and considering $S_{00}$ and $S_{10}$ constants, the CL value for a model with a single zero-delay loop is calculated as:

$$CL = f(M_{00}, M_{10}) = M_{10} \cdot S_{00} - M_{00} \cdot S_{10}/(M_{10} - M_{00}) \quad (6)$$

From above, it can be seen that, for a digital model with a single zero-delay loop, two input stimulus values $S_{00}$ and $S_{10}$, and two measured output values $M_{00}$ and $M_{10}$ are required to compute the CL value. Complexity of the Stimuli and measured output values depends on the number of zero-delay loops that a digital model contains. For a digital model comprising a set of zero-delay loops, for example, N loops (as in FIG. 3a), the translation methodology module 104 is configured to determine a set of closed loop values respectively associated with the set of zero-delay loops. As indicated above, in such embodiments, the translation methodology module 104 is configured to determine the set of CL values based on input stimuli values provided at input break points of circuit paths associated with the set of zero-delay loops and output measurement values determined based on measurements from output break points of the circuit paths associated with the set of zero-delay loops.

In the embodiments with a set of zero-delay loops (i.e., one or more zero-delay loops), the input stimuli values comprise a plurality of stimuli sets provided to the set of zero-delay loops. In some embodiments, each stimuli set comprises a set of stimulus values provided to the input break points of the circuit paths associated with the set of zero delay loops, respectively. Further, the output measurement values comprise a respective plurality of measured output value sets determined from the set of zero delay loops in response to providing the plurality of stimuli sets to the set of zero-delay loops. In some embodiments, each measured output value set comprises a set of measured output values determined based on measurements from output break points associated with the set of zero delay loops, respectively. In some embodiments, a number of stimuli sets within the plurality of stimuli sets is equal to one greater than a number of zero-delay loops in the set of zero-delay loops associated with the digital model. Further, a number of measured output value sets within the plurality of measured output value sets is equal to one greater than the number of zero-delay loops in the set of zero-delay loops associated with the digital model. More particularly, for a general digital model with n zero-delay loops, n+1 stimuli sets and n+1 measured output value sets are required, in order to compute the closed loop (CL) values (e.g., n CL values in this case).

Considering a digital model with two loops, two CL values $CL_0$ and $CL_1$ needs to be computed. For a digital model with 2 zero-delay loops, the input stimulus values are denoted in matrix form as:

$$stimlst_{ji} = \begin{bmatrix} S_{00} & S_{10} & S_{20} \\ S_{01} & S_{11} & S_{21} \end{bmatrix} \quad (7)$$

Where j is the index of the stimulus set and i is the index of the zero-delay loop. Accordingly, $S_{00}$ and $S_{01}$ forms a first stimulus set, $S_{10}$ and $S_{11}$ forms a second stimulus set, and $S_{20}$ and $S_{21}$ forms a third stimulus set.

And the output measurement values are denoted in matrix form as:

$$measlst_{ji} = \begin{bmatrix} M_{00} & M_{10} & M_{20} \\ M_{01} & M_{11} & M_{21} \end{bmatrix} \quad (8)$$

Where j is the index of the measured output value set and i is the index of the zero-delay loop. Accordingly, $M_{00}$ and $M_{01}$ forms a first measured output value set, $M_{10}$ and $M_{11}$ forms a second measured output value set, and $M_{20}$ and $M_{21}$ forms a third measured output value set. In some embodiments, each measured output value $M_{00}$, $M_{01}$ ... $M_{21}$ within the matrix $measlst_{ji}$ is similar to the measured output value $Meas_{out}$ described with respect to equation (1).

For two loops, model behavior can be described using the equations below:

$$\begin{aligned} M_{00} &= \alpha_{00} \cdot S_{00} + \alpha_{01} \cdot S_{01} + \beta_0 \\ M_{01} &= \alpha_{10} \cdot S_{00} + \alpha_{11} \cdot S_{01} + \beta_1 \\ M_{10} &= \alpha_{00} \cdot S_{10} + \alpha_{01} \cdot S_{11} + \beta_0 \\ M_{11} &= \alpha_{10} \cdot S_{20} + \alpha_{11} \cdot S_{11} + \beta_1 \\ M_{20} &= \alpha_{00} \cdot S_{20} + \alpha_{01} \cdot S_{21} + \beta_0 \\ M_{21} &= \alpha_{10} \cdot S_{20} + \alpha_{11} \cdot S_{21} + \beta_1 \end{aligned} \quad (9)$$

The conditions used for calculating closed loop results ($CL_0$ and $CL_1$) are:

$$\alpha_{00} \cdot CL_0 + \alpha_{01} \cdot CL_1 + \beta_0 = 0 \quad (10)$$

$$\alpha_{10} \cdot CL_0 + \alpha_{11} \cdot CL_1 + \beta_1 = 0 \quad (11)$$

From the above conditions, $CL_0$ and $CL_1$ equations depend on six parameters: $\alpha_{00}$, $\alpha_{01}$, $\alpha_{10}$, $\alpha_{11}$, $\beta_0$, $\beta_1$. This parameters are extracted considering $S_{00}$ ... $S_{21}$ stimuli with constant values in equation (9) created for describing model behavior.

Assuming this, $CL_0$ and $CL_1$ are derived as below:

$$CL_0 = f(M_{00}, M_{01}, M_{10}, M_{11}, M_{20}, M_{21}) \quad (11)$$

$$CL_1 = f(M_{00}, M_{01}, M_{10}, M_{11}, M_{20}, M_{21}) \quad (12)$$

More specifically, $$CL_0 = S_{00} \cdot (M_{11} \cdot M_{20} - M_{10} \cdot M_{21}) + S_{10} \cdot (M_{00} \cdot M_{21} - M_{01} \cdot M_{20}) + S_{20} \cdot (M_{01} \cdot M_{10} - M_{00} \cdot M_{11})/den \quad (13)$$

$$CL_1 = S_{01} \cdot (M_{11} \cdot M_{20} - M_{10} \cdot M_{21}) + S_{11} \cdot (M_{00} \cdot M_{21} - M_{01} \cdot M_{20}) + S_{21} \cdot (M_{01} \cdot M_{10} - M_{00} \cdot M_{11})/den \quad (13)$$

Where $$den = M_{11} \cdot M_{20} - M_{10} \cdot M_{21} + M_{00} \cdot M_{21} - M_{01} \cdot M_{20} + M_{01} \cdot M_{10} - M_{00} \cdot M_{11}$$

Using matrix determinant formula, $CL_0$ and $CL_1$ equations can be simplified as follows:

$$CL_0 = \quad (15)$$

$$S_{00} \cdot \begin{vmatrix} M_{10} & M_{20} \\ M_{11} & M_{21} \end{vmatrix} - S_{10} \cdot \begin{vmatrix} M_{00} & M_{20} \\ M_{01} & M_{21} \end{vmatrix} + S_{20} \cdot \begin{vmatrix} M_{00} & M_{10} \\ M_{01} & M_{11} \end{vmatrix} \Big/ den$$

$$CL_1 = \quad (16)$$

$$S_{01} \cdot \begin{vmatrix} M_{10} & M_{20} \\ M_{11} & M_{21} \end{vmatrix} - S_{11} \cdot \begin{vmatrix} M_{00} & M_{20} \\ M_{01} & M_{21} \end{vmatrix} + S_{21} \cdot \begin{vmatrix} M_{00} & M_{10} \\ M_{01} & M_{11} \end{vmatrix} \Big/ den$$

Where, $$den = \begin{vmatrix} M_{10} & M_{20} \\ M_{11} & M_{21} \end{vmatrix} - \begin{vmatrix} M_{00} & M_{20} \\ M_{01} & M_{21} \end{vmatrix} + \begin{vmatrix} M_{00} & M_{10} \\ M_{01} & M_{11} \end{vmatrix}$$

$$\text{Assuming } MatTerm_j = \left[ \begin{bmatrix} M_{10} & M_{20} \\ M_{11} & M_{21} \end{bmatrix} \begin{bmatrix} M_{00} & M_{20} \\ M_{01} & M_{21} \end{bmatrix} \begin{bmatrix} M_{00} & M_{10} \\ M_{01} & M_{11} \end{bmatrix} \right],$$

the above equations may be denoted as follows:

$$CL_0 = S_{00} \cdot |MatTerm_0| - S_{10} \cdot |MatTerm_1| + S_{20} \cdot |MatTerm_2|/den \quad (17)$$

$$CL_1 = S_{01} \cdot |MatTerm_0| - S_{11} \cdot |MatTerm_1| + S_{21} \cdot |MatTerm_2|/den \quad (18)$$

Where, $$den = |MatTerm_0| - |MatTerm_1| + |MatTerm_2|$$

In some embodiments, $MatTerm_j$ is a vector of square matrices, each square matrix formed by eliminating a corresponding $j^{th}$ column from the $measlst_{ji}$ matrix in equation (8).

Extending the above methodology for a generic digital model with N loops, where N is any real number greater than or equal to 1, the input stimulus values are denoted in matrix form as:

$$stimlst_{ji} = \begin{bmatrix} S_{00} & S_{10} & \cdots & S_{N0} \\ S_{01} & S_{11} & \cdots & S_{N1} \\ \cdots & \cdots & \cdots & \cdots \\ S_{0N-1} & S_{1N-1} & \cdots & S_{NN-1} \end{bmatrix} \quad (19)$$
$$\underbrace{\phantom{S_{00}}}_{\text{Set } 0} \underbrace{\phantom{S_{10}}}_{\text{Set } 1} \underbrace{\phantom{S_{N0}}}_{\text{Set } N}$$

Where j is the index of the stimulus set and i is the index of the zero-delay loop. In particular, the input stimulus values $stimlst_{ji}$ comprises a N+1 stimulus sets, set0, set1 . . . setN. Further, each of the stimulus set comprises a stimulus value corresponding to each of the N zero-delay loops.

And the output measurement values are denoted in matrix form as:

$$measlst_{ji} = \begin{bmatrix} M_{00} & M_{10} & \cdots & M_{N0} \\ M_{01} & M_{11} & \cdots & M_{N1} \\ \cdots & \cdots & \cdots & \cdots \\ M_{0N-1} & M_{1N-1} & \cdots & M_{NN-1} \end{bmatrix} \quad (20)$$
$$\underbrace{\phantom{M_{00}}}_{\text{Set } 0} \underbrace{\phantom{M_{10}}}_{\text{Set } 1} \underbrace{\phantom{M_{N0}}}_{\text{Set } N}$$

Where j is the index of the measured output value set and i is the index of the zero-delay loop. In particular, the output measurement values $measlst_{ji}$ comprises N+1 measured output value sets, set0, set1 . . . setN. Further, each of the measured output value set comprises a measured output value corresponding to each of the N zero-delay loops. In some embodiments, each measured output value $M_{00}$, $M_{01}$ . . . $M_{NN-1}$ within the matrix $measlst_{ji}$ is similar to the measured output value $Meas_{out}$ described with respect to equation (1) above.

Further, a generic equation for computing CL value for a digital model with N loops is derived (utilizing the same method explained above for two loops) as given below:

$$CL_i = \frac{\sum_{j=0}^{N}(-1)^j \cdot |MatTerm_j| \cdot stimlst_{ji}}{\sum_{j=0}^{N}(-1)^j \cdot |MatTerm_j|} \quad (21)$$

Where, i is the index of the zero-delay loop, j is the index of the set and $MatTerm_j$ is a vector which contains all possible measlst square matrix N×N as follows:

$$MatTerm_j = \begin{bmatrix} \begin{bmatrix} M_{10} & \cdots & M_{N0} \\ M_{11} & \cdots & M_{N1} \\ \cdots & \cdots & \cdots \\ M_{1N-1} & \cdots & M_{NN-1} \end{bmatrix}_{0} \begin{bmatrix} M_{00} & M_{20} & \cdots & M_{N0} \\ M_{01} & M_{21} & \cdots & M_{N1} \\ \cdots & \cdots & \cdots & \cdots \\ M_{0N-1} & M_{2N-1} & \cdots & M_{NN-1} \end{bmatrix}_{1}$$

-continued $$\cdots \begin{bmatrix} M_{00} & \cdots & M_{k-10} & M_{k+10} & \cdots & M_{N0} \\ M_{01} & \cdots & M_{k-11} & M_{k+11} & \cdots & M_{N1} \\ \cdots & \cdots & \cdots & \cdots & \cdots & \cdots \\ M_{0N-1} & \cdots & M_{k-1N-1} & M_{k+N-1} & \cdots & M_{NN-1} \end{bmatrix}_{k}$$

$$\cdots \begin{bmatrix} M_{00} & \cdots & M_{N-10} \\ M_{01} & \cdots & M_{N-11} \\ \cdots & \cdots & \cdots \\ M_{0N-1} & \cdots & M_{N-1N-1} \end{bmatrix}_{N}$$

Where each measlst square matrix N×N in $MatTerm_1$ is equivalent to $measlst_{ji}$ with the corresponding jth column eliminated. In some embodiments, the equation (21) above is further referred to as a closed loop (CL) value relation.

In deriving the set of CL values in the above embodiments (e.g., using the CL value relation in equation (21) above), each measured output value $M_{00}$, $M_{01}$ . . . —$M_{NN-1}$ within the matrix $measlst_{ji}$ corresponds to a difference between a response value (voltage/current) that is measured at the output break point of a zero-delay loop response to providing a stimulus value at a corresponding input breakpoint and the stimulus value provided at the input break point. However, in other embodiments, each measured output value $M_{00}$, $M_{01}$ . . . —$M_{NN-1}$ within the matrix $measlst_{ji}$ may be equal to the response value (voltage/current) that is measured at the output break point of a zero-delay loop in response to providing a stimulus value at the corresponding input breakpoint. In such embodiments, the set of CL values respectively associated with the set of zero-delay loops may be computed based the input stimulus values $stimlst_{ji}$ and the output measurement values $measlst_{ji}$, in accordance with a predefined relation that is different from CL value relation in equation (21) above.

Figure 4:
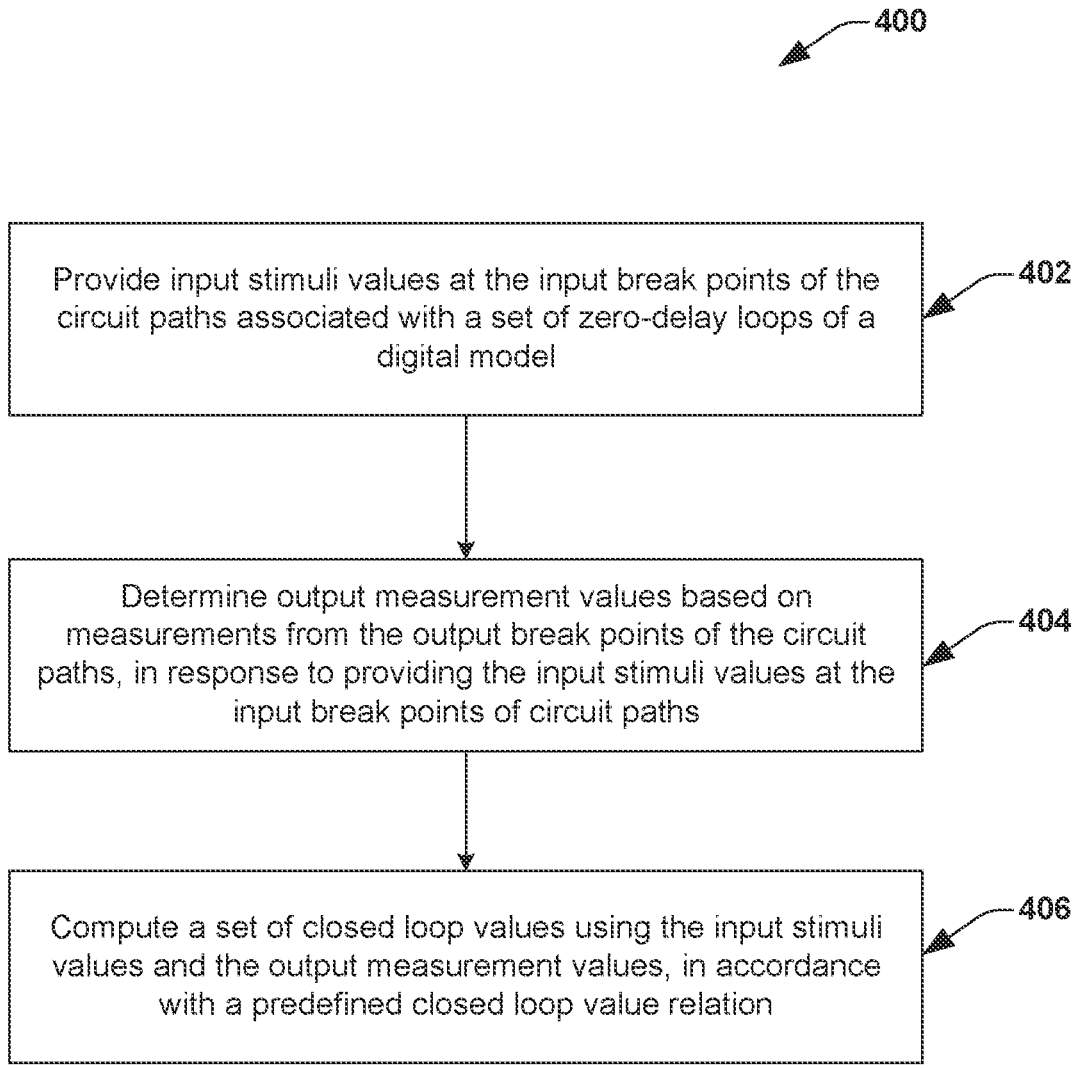
FIG. 4 illustrates the linear CL value determination algorithm utilized by the translation methodology module for determining a set of CL values for a digital model comprising a set of zero-delay loops, when the digital model comprises only linear components, according to one embodiment of the disclosure.

Referring back to FIG. 1, in some embodiments, the analog circuit netlist (e.g., the analog circuit netlist 202 in FIG. 2a) received at the model translation module 102 comprises only linear components. In such embodiments, a corresponding digital model (e.g., the digital model 210 in FIG. 2b or the digital model 300 in FIG. 3a) also comprises only linear components. In such embodiments, the translation methodology module 104 is configured to determine CL values of the zero-delay loop(s) associated with the digital model, in accordance with a linear closed loop (CL) value determination algorithm 400 in FIG. 4. In particular, FIG. 4 illustrates the linear CL value determination algorithm 400 utilized by the translation methodology module 104 for determining a set of CL values for a digital model comprising a set of zero-delay loops, when the digital model comprises only linear components, according to one embodiment of the disclosure. The algorithm 400 is explained herein with reference to the digital model 320 in FIG. 3b, where the digital model 320 is assumed to comprise only linear components.

At 402, input stimuli values (e.g., $stimlst_{ji}$ in equation (19) above) are provided by the translation methodology module 104 at the input break points of the circuit paths associated with a set of zero-delay loops of a digital model. In some embodiments, the input stimuli values comprise a plurality of stimuli sets, each stimuli set comprising a set of stimulus values provided to the input break points of the circuit paths associated with the set of zero delay loops, respectively. In some embodiments, the translation methodology module 104 is configured to provide each stimuli set of the plurality of stimuli sets sequentially to the input breakpoints associated with the set of zero-delay loops. In some embodiments, the input stimuli values are predefined and stored in a memory associated with the translation methodology module 104. In some embodiments, the input stimuli values $S_{00}$, $S_{01} \ldots S_{0N-1}$ depicted in FIG. 3*b* forms a first stimulus set Set0 of the matrix $stimlst_{ji}$ in equation (19) above. Although not shown, other stimuli sets associated with the matrix $stimlst_{ji}$ are also provided sequentially to the input breakpoints associated with the set of zero-delay loops in FIG. 3*b*.

At 404, output measurement values (e.g., $measlst_{ji}$ in equation (20) above) are determined by the translation methodology module 104 based on measurements from the output break points of the circuit paths, in response to providing the input stimuli values (e.g., $stimlst_{ji}$ in equation (19) above) at the input break points of circuit paths. In some embodiments, the output measurement values comprise a respective plurality of measured output value sets determined from the set of zero delay loops in response to providing the plurality of stimuli sets to the input breakpoints. In some embodiments, each measured output value set comprises a set of measured output values determined based on measurements from output break points associated with the set of zero delay loops, respectively. In some embodiments, the translation methodology module 104 is configured to determine each measured output value set of the plurality of measured output value sets sequentially, in response to providing the corresponding stimuli set to the input breakpoints. In some embodiments, the translation methodology module 104 is configured to save/store the determined output measurement values in a memory associated with the translation methodology module 104. In some embodiments, the output measurement values $M_{00}$, $M_{01} \ldots M_{0N-1}$ depicted in FIG. 3*b* forms a first measured output value set of the matrix $measlst_{ji}$ in equation (20) above. Although not shown, other measured output value sets associated with the matrix $measlst_{ji}$ are also determined sequentially based on measurements from output break points associated with the set of zero delay loops in FIG. 3*b*.

At 406, a set of closed loop values is determined by the translation methodology module 104 using the input stimuli values (e.g., $stimlst_{ji}$ in equation (19) above) and the output measurement values (e.g., $measlst_{ji}$ in equation (20) above), in accordance with a predefined closed loop value relation (e.g., the CL value relation in equation (21) above). In some embodiments, the translation methodology module 104 is configured to determine the set of CL values associated with the digital model in a single timeslot or a single delta cycle. More specifically, the translation methodology module 104 is configured to implement the linear CL value determination algorithm 400 comprising providing the input stimuli values (at 402 above), determining the output measurement values (at 404 above) and computing the set of closed loop values (at 406 above), in the single timeslot or the single delta cycle. Delta cycles are non time-consuming timesteps used by Very High Speed Integrated Circuit Hardware Description Language (VHDL) simulators for modeling events during execution of VHDL code. They are events that happen in zero simulation time after a preceding event. Timeslot is a corresponding term defined in Verilog. However, both deltacycle and timeslot refer to actions that are executed in zero duration on the real timeline.

Referring back to FIG. 1, upon determining the set of CL values based on implementing the CL value determination algorithm 400, in some embodiments, the translation methodology module 104 is further configured to provide the determined set of closed loop values to the input break points of the circuit paths associated with the respective set of zero-delay loops, thereby converting the digital model to form an event driven model. In some embodiments, the event-driven model comprises a digital engine specific model that can be simulated on digital engines (with the zero-delay loops eliminated from the digital models). In some embodiments, when the set of CL values are provided to the input break points of the circuit paths associated with the set of zero-delay loops, response values equal to the set of CL values are generated at the output break points of the circuit paths associated with the respective set of zero-delay loops, thereby eliminating the effect of zero-delay loops. In some embodiments, the translation methodology module 104 is configured to provide the determined set of closed loop values to the input break points of the circuit paths associated with the respective set of zero-delay loops, during the same timeslot or delta cycle during which the set of CL values are determined (based on implementing the linear CL value determination algorithm 400).

In some embodiments, the analog circuit netlist (e.g., the analog circuit netlist 202 in FIG. 2*a*) received at the model translation module 102 may comprise one or more reactive components like capacitors, inductors etc. In such embodiments, the translation methodology module 104 is configured to provide one or more input history signals/bits HSTi[k], that forms an input history vector signal HSTi, to the one or more reactive components, respectively, of the corresponding digital model. In some embodiments, the input history vector signal HSTi comprises a concatenation of the one or more input history signals/bits HSTi[k], wherein each input history signal/bit HSTi[k] is indicative of the histories/internal state of a respective reactive component. As can be seen in FIG. 3*a* and FIG. 3*b*, the translation methodology module 104 is configured to provide the input history signal HSTi[0] to the component module 302 and the input history signal HSTi[1] to the component module 304, wherein the component modules 302 and 304 comprise reactive components. In some embodiments, the input history vector signal HSTi 306 in FIG. 3*a* and FIG. 3*b* comprises a concatenation of the input history signals/bits HSTi[0] and HSTi[1].

Further, the translation methodology module 104 is configured to receive one or more output history signals/bits HSTo[k] that forms an output history vector signal HSTo from the one or more reactive components, respectively. In some embodiments, HSTo[k] comprises an internal state of a respective reactive component at a specific simulation time. In some embodiments, the output history vector signal HSTo comprises a concatenation of one or more output history signals/bits HSTo[k], wherein each output history signal/bit HSTo[k] is indicative of the histories/internal state of a respective reactive component at the specific simulation time. As can be seen in FIG. 3*a* and FIG. 3*b*, the translation methodology module 104 is configured to receive the output history signal HSTo[0] from the component module 302 and the output history signal HSTo[1] from the component module 304. In some embodiments, the output history vector signal HSTo 308 in FIG. 3*a* and FIG. 3*b* comprises a concatenation of the output history signals/bits HSTo[0] and HSTo[1].

In some embodiments, the reactive components within a digital model include a history input port configured to receive a corresponding input history signal/bit HSTi[k] from the translation methodology module 104. Further, the reactive components within the digital model include a history output port configured to provide a corresponding output history signal/bit HSTo[k] to the translation methodology module 104. In some embodiments, the translation methodology module 104 is configured to provide the input history vector signal HSTi to the one or more reactive components of the digital model, prior to determining the set of closed loop (CL) values associated with the digital model (or prior to the execution of the linear CL value determination algorithm 400 in FIG. 4). Further, the input history vector signal HSTi is latched while the CL values are determined based on the linear CL value determination algorithm 400 in FIG. 4.

Upon determination of the set of CL values (or upon completion of the execution of the linear CL value determination algorithm 400 in FIG. 4), in some embodiments, the translation methodology module 104 is configured to update the input history vector signal HSTi (e.g., the HSTi 306 in FIG. 3b) based on an output history vector signal HSTo (e.g., the HSTi 308 in FIG. 3b). In other words, the translation methodology module 104 is configured to pass on the HSTo signal received from the one or more reactive components as the HSTi signal to the one or more reactive components, once the set of CL values for the digital model are determined, in order to insert correct history for the one or more reactive components. In some embodiments, updating the input history vector signal HSTi based on an output history vector signal HSTo corresponds to updating the one or more input history signals/bits HSTi[k] with the one or more output history signals/bits HSTo[k]. In some embodiments, the translation methodology module 104 is configured to update the input history vector signal HSTi based on an output history vector signal HSTo in the same timeslot or delta cycle during which the set of CL values associated with the digital model are determined (or in the same timeslot or delta cycle during which the linear CL value determination algorithm 400 in FIG. 4 is executed).

Figure 5:
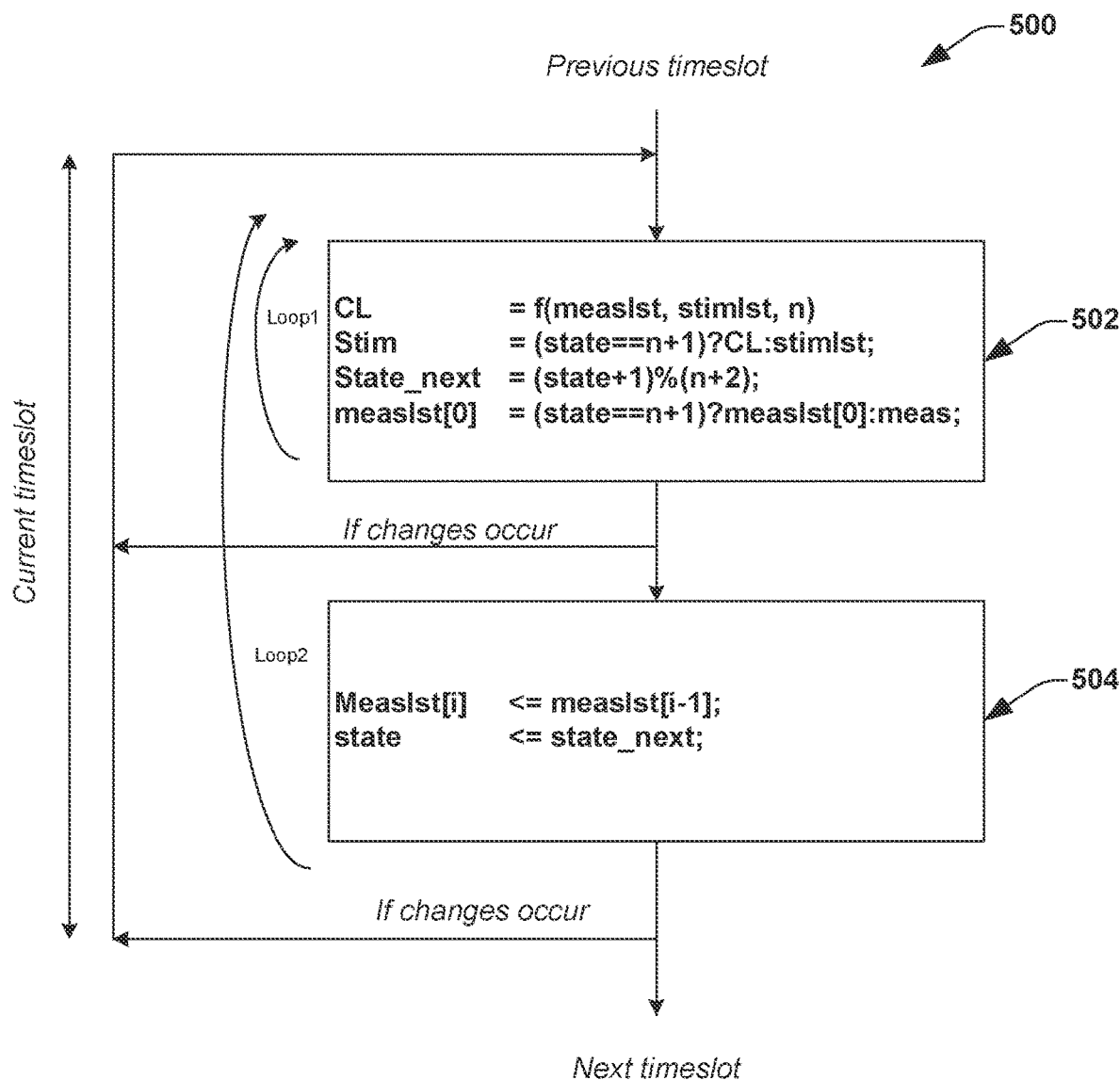
FIG. 5 depicts the method for closed loop result implementation for a digital model with linear characteristic, using the event scheduler of Verilog or System Verilog, according to one embodiment of the disclosure.

In some embodiments, a method for CL result implementation that includes the determination of the set of CL values $CL_i$ (based on the executing the linear CL value determination algorithm 400), providing the determined set of CL values $CL_i$ to the input break points of the zero-delay loops and updating the input history signal HSTi, is performed by the translation methodology module 104, within the same timeslot or delta cycle, using the internal event scheduler of Verilog or System Verilog, as illustrated in FIG. 5. In particular, FIG. 5 depicts the method 500 for closed loop result implementation for a digital model with linear characteristic (i.e., including only linear components), using the event scheduler of Verilog or System Verilog, according to one embodiment of the disclosure. In some embodiments, the method 500 is implemented within the translation methodology module 104 in FIG. 1. In some embodiments, the instructions for implementing the method 500 for the closed loop result implementation are ordered in two event regions, the active region 502 and the non-blocking assignment (NBA) region 504 (e.g., the active region and the NBA region specified in the Verilog IEEE standard). In some embodiments, the active region and the NBA region are executed by the internal event scheduler using two internal loops, Loop1 and Loop2, the execution of which are completed in a single timeslot or delta cycle. In some embodiments, all the variables that are calculated instantly are put on the ACTIVE region 502 and all variables that has memory are put on the NBA region 504.

The closed loop (CL) value is computed in the Active region 502. The signal CL contains correct value after all stimuli sets needed are inserted at loops inputs (or input break points). The signal state corresponds to the number of stimuli sets. The signal state_next is used for stopping CL calculation when CL has reached correct value (when calculation is finished, signal state_next contains the value n+1, where n is the number of loops). Each time the active region 502 is executed, a new stimuli is applied and corresponding measured value(s), measlst[0] are determined. In the NBA loop 504, first column of measlst matrix receives measured values every time when a new set of stimuli is applied (or the active region is executed) and all the other columns are shifted to the right. In the NBA region 504, the signal state is updated with the value of state_next. Every time the value of the signal state is changed, active region 502 is re-executed (a new set of stimuli is applied). If the state remains constant, the compiler step up at next time slot. Although, not shown, in some embodiments, the input history vector signal HSTi is updated based on an output history vector signal HSTo within the NBA region 504.

Referring back to FIG. 1, in some embodiments, the analog circuit netlist received at the model translation module 102 comprises one or more non-linear components like diodes, MOSFETs etc. In such embodiments, a corresponding digital model also comprises the one or more non-linear components. FIG. 6a illustrates a digital model 600 with N zero-delay loops that comprises non-linear components, according to one embodiment of the disclosure. In particular, the component module 602 and the component module 604 in FIG. 6a includes non-linear components. FIG. 6b illustrates a digital model 620 (similar to the digital model 600 in FIG. 6a) comprising the non-linear components with the zero-delay loops opened to form input break points and output break points, in order to determine the set of closed loop (CL) values, according to one embodiment of the disclosure. When the analog circuit netlist comprises one or more non-linear components, the analog circuit netlist (or the corresponding digital model) comprises a plurality of operating regions that describes the behavior of the analog circuit netlist (or the digital model) at a specific time. Therefore, in such embodiments, the translation methodology module 104 is configured to determine a set of CL values associated with the digital model, corresponding to a correct operating region of the plurality of operating regions associated with the analog circuit netlist (or the digital model). In order to determine the set of CL values corresponding to a correct operating region, in some embodiments, the translation methodology module 104 is configured to determine one or more region specific sets of closed loop (CL) values corresponding to one or more operating regions, respectively, of the analog circuit netlist (or the digital model), until a region specific set of closed loop values associated with a correct operating region is determined, as can be fully appreciated in embodiments below. In some embodiments, the region specific set of closed loop values that is associated with the correct operating region correspond to the set of CL values for the digital model.

In order to account for the various operating regions for the digital model comprising non-linear components, each non-linear component within the digital model includes a region input point that is configured to receive an input region signal RGNi[k] and a region output point that is configured to provide an output region signal RGNo[k], as illustrated in FIG. 6a and FIG. 6b. In such embodiments, the translation methodology module 104 is configured to determine each region-specific set of closed loop values of the one or more region specific sets of closed loop values based on providing an input region vector signal RGNi comprising one or more input region signals/bits RGNi[k] to region input points of the respective one or more non-linear components, where k depicts the number of non-linear components. In some embodiments, the input region vector signal RGNi defines an operating region of the plurality of operating regions of the analog circuit netlist (or the digital model). In some embodiments, the input region vector signal RGNi comprises a concatenation of input region signals/bits RGNi[k] associated with each of the one or more non-linear components within the digital model. FIG. 6b depicts an input region vector signal RGNi 608 that is a concatenation of the input region signals/bits RGNi[0] and RGNi[1] that are provided to the region input points of the component module 602 and the component module 604, respectively.

Further, the translation methodology module 104 is configured to determine whether the determined region-specific set of CL values is associated with a correct operating region (in other words, to determine whether the operating region identified by RGNi corresponds to a correct operating region) based on an output region vector signal RGNo comprising one or more output region signals/bits RGNo[k] received from the region output points of the respective one or more non-linear components, where k depicts the number of non-linear components. In some embodiments, the output region vector signal RGNo comprises a concatenation of output region signals/bits RGNo[k] associated with each of the one or more non-linear components within the digital model. FIG. 6b depicts an output region vector signal RGNi 610 that is a concatenation of the output region signals/bits RGNo[0] and RGNo[1] that are received from the region output points of the component module 602 and the component module 604, respectively.

With regard to the digital model 620 in FIG. 6b, in order to determine a region-specific set of closed loop values, the translation methodology module 104 is configured to provide the input region vector signal RGNi 608 (indicative of a specific operating region) comprising the input region signals/bits RGNi[0] and RGNi[1] to region input points of the component module 602 and the component module 604, respectively. Upon providing the input region vector signal RGNi 608, the translation methodology module 104 is configured to provide input stimuli values (e.g., $stimlst_{ji}$ in equation (19) above) at the input break points of the circuit paths associated with a set of zero-delay loops of a digital model. In some embodiments, the input stimuli values $S_{00}$, $S_{01}$ ... $S_{0N-1}$ depicted in FIG. 6b forms a first stimulus set of the matrix $stimlst_{ji}$ in equation (19) above. The translation methodology module 104 is further configured to determine output measurement values (e.g., $measlst_{ji}$ in equation (20) above) based on measurements from the output break points of the circuit paths, in response to providing the input stimuli values (e.g., $stimlst_{ji}$ in equation (19) above) at the input break points of circuit paths. In some embodiments, the output measurement values $M_{00}$, $M_{01}$ ... $M_{0N-1}$ depicted in FIG. 6b forms a first measured output value set of the matrix $measlst_{ji}$ in equation (20) above. Further, the translation methodology module 104 is configured to determine the region-specific set of closed loop values using the input stimuli values and the output measurement values, in accordance with the CL value relation in equation (21) above.

Figure 7:
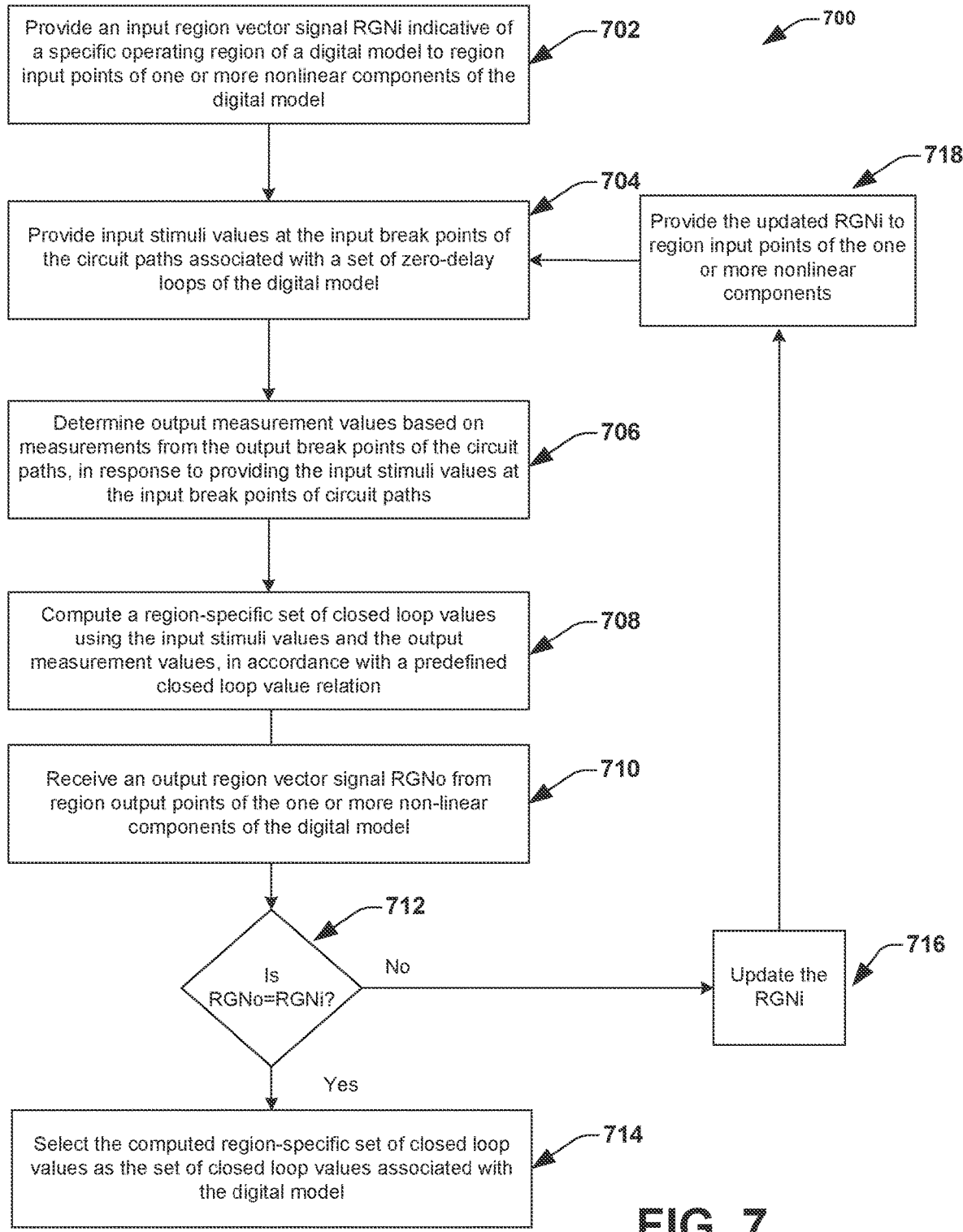
FIG. 7 illustrates a non-linear CL value determination algorithm utilized by the translation methodology module for determining a set of CL values for a digital model comprising a set of zero-delay loops, when the digital model comprises one or more non-linear components, according to one embodiment of the disclosure.

FIG. 7 illustrates a non-linear CL value determination algorithm 700 utilized by the translation methodology module 104 for determining a set of CL values for a digital model comprising a set of zero-delay loops, when the digital model comprises one or more non-linear components, according to one embodiment of the disclosure. The algorithm 700 is explained with reference to the digital model 620 in FIG. 6b. At 702, an input region vector signal RGNi (e.g., the RGNi 608 in FIG. 6b) indicative of a specific operating region of a digital model (e.g., the digital model 620 in FIG. 6b) is provided to region input points of one or more nonlinear components (e.g., the component modules 602 and 604 in FIG. 6b) associated with the digital model. At 704, input stimuli values (e.g., $stimlst_{ji}$ in equation (19) above) are provided by the translation methodology module 104 at the input break points of the circuit paths associated with a set of zero-delay loops of the digital model. In some embodiments, the input stimuli values comprise a plurality of stimuli sets, each stimuli set comprising a set of stimulus values provided to the input break points of the circuit paths associated with the set of zero delay loops, respectively. In some embodiments, the translation methodology module 104 is configured to provide each stimuli set of the plurality of stimuli sets sequentially to the input breakpoints associated with the set of zero-delay loops. In some embodiments, the input stimuli values are predefined and stored in a memory associated with the translation methodology module 104. In some embodiments, the input stimuli values $S_{00}$, $S_{01}$ ... $S_{0N-1}$ depicted in FIG. 6b forms a first stimulus set of the matrix $stimlst_{ji}$ in equation (19) above. Although not shown, other stimuli sets associated with the matrix $stimlst_{ji}$ are also provided sequentially to the input break points of the circuit paths associated with the set of zero delay loops in FIG. 6b.

At 706, output measurement values (e.g., $measlst_{ji}$ in equation (20) above) are determined by the translation methodology module 104 based on measurements from the output break points of the circuit paths, in response to providing the input stimuli values (e.g., $stimlst_{ji}$ in equation (19) above) at the input break points of circuit paths. In some embodiments, the output measurement values comprise a respective plurality of measured output value sets determined from the set of zero delay loops in response to providing the plurality of stimuli sets to the input breakpoints. In some embodiments, each measured output value set comprises a set of measured output values determined based on measurements from output break points associated with the set of zero delay loops, respectively. In some embodiments, the translation methodology module 104 is configured to determine each measured output value set of the plurality of measured output value sets sequentially, in response to providing the corresponding stimuli set to the input breakpoints. In some embodiments, the translation methodology module 104 is configured to save/store the determined output measurement values in a memory associated with the translation methodology module 104. In some embodiments, the output measurement values $M_{00}$, $M_{01}$ ... $M_{0N-1}$ depicted in FIG. 6b forms a first measured output value set of the matrix $measlst_{ji}$ in equation (20) above. Although not shown, other measured output value sets associated with the matrix $measlst_{ji}$ are also determined sequentially based on measurements from output break points associated with the set of zero delay loops in FIG. 6b.

At 708, a region-specific set of closed loop values is computed by the translation methodology module 104 using the input stimuli values and the output measurement values, in accordance with a predefined closed loop value relation (e.g., the CL value relation in equation (21) above). At 710, an output region vector signal RGNo (e.g., the RGNo 610 in FIG. 6b) is received from region output points of the one or more non-linear components (e.g., the component modules 602 and 604 in FIG. 6b) of the digital model. At 712, a determination whether the RGNi is equal to RGNo is made. In some embodiments, the specific operating region identified by RGNi comprises a correct operating region, when RGNi is determined to be equal to RGNo. If RGNi is determined to be equal to RGNo, then the region-specific set of CL values determined at 708 corresponds to a correct operating region. If yes at 712, the algorithm proceeds to 714, where the computed region-specific set of closed loop values is selected as the set of closed loop values associated with the digital model.

If No at 712, the algorithm, proceeds to 716, in order to determine another region-specific set of CL values corresponding to an updated RGNi. In particular, at 716, the input region vector signal RGNi is updated to form an updated RGNi. In some embodiments, the updated RGNi is indicative of a subsequent operating region of the digital model. In some embodiments, the subsequent operating region is chosen by the translation methodology module 104, in accordance with a predefined region search algorithm. In some embodiments, the region search algorithm use a vector near which indicates the range between current operating region and its first stage adjacent regions, and is configured to search a next operating region among the nearest ones. This consideration is made following the fact that model evolution in time is gradual so region vector will change gradual as well. If the correct operating region can't be found between adjacent ones, the region search algorithm starts from an initial region (first adjacent region) and increments depending on near vector with 1 bit until it reaches correct operating region (which means RGNi equal RGNo).

At 718, the updated RGNi is provided to the region input points of the one or more nonlinear components. Then the algorithm proceeds to repeat the actions/acts at 704, 706 and 708 to compute a subsequent region-specific set of CL values corresponding to the updated RGNi. Further, the algorithm proceeds to repeat the actions/acts at 710 and 712 to determine whether the computed subsequent region-specific set of CL values corresponds to a correct operating region. In some embodiments, the acts 718, 704, 706, 708, 710 and 712 are repeated, each time the input region vector signal RGNi is updated at 716. In other words, the acts 716, 718, 704, 706, 708, 710 and 712 are repeated until a correct operating region is determined at 712 (i.e., until RGNi becomes equal to RGNo). In some embodiments, the translation methodology module 104 is configured to determine the set of CL values associated with the digital model in a single timeslot or a single delta cycle. More specifically, the translation methodology module 104 is configured to implement the non-linear CL value determination algorithm 700 in FIG. 7, in the single timeslot or the single delta cycle.

Referring back to FIG. 1, upon determining the set of CL values based on implementing the non-linear CL value determination algorithm 700, in some embodiments, the translation methodology module 104 is further configured to provide the determined set of closed loop values to the input break points of the circuit paths associated with the respective set of zero-delay loops (e.g., in the digital model 620 in FIG. 6*b*), thereby converting the digital model to form an event driven model. In some embodiments, the event-driven model comprises a digital engine specific model that can be simulated on digital engines (with the zero-delay loops eliminated from the digital models). In some embodiments, when the set of CL values are provided to the input break points of the circuit paths associated with the set of zero-delay loops, response values equal to the set of CL values are generated at the output break points of the circuit paths associated with the respective set of zero-delay loops, thereby eliminating the effect of zero-delay loops. In some embodiments, the translation methodology module 104 is configured to provide the determined set of closed loop values to the input break points of the circuit paths associated with the respective set of zero-delay loops, during the same timeslot or delta cycle during which the set of CL values are determined (by implementing the non-linear CL value determination algorithm 700).

In some embodiments, the analog circuit netlist received at the model translation module 102 may comprise one or more reactive components like capacitors, inductors etc. In such embodiments, a corresponding digital model also comprises the one or more reactive components. For example, the component modules 602 and 606 of the digital model 620 includes reactive components. In such embodiments, the translation methodology module 104 is configured to provide one or more input history signals/bits HSTi[k] that forms an input history vector signal HSTi (e.g., the HSTi 612 in FIG. 6*a* and FIG. 6*b*) to the one or more reactive components, respectively, of the corresponding digital model. In some embodiments, the input history vector signal HSTi comprises a concatenation of the one or more input history signals/bits HSTi[k], wherein each input history signal/bit HSTi[k] is indicative of the histories/internal state of a respective reactive component. As can be seen in FIG. 6*b*, the translation methodology module 104 is configured to provide the input history signal/bit HSTi[0] to the component module 602 and the input history signal HSTi[1] to the component module 606, wherein the component modules 602 and 606 comprise reactive components. In some embodiments, the input history vector signal HSTi 612 in FIG. 6*a* and FIG. 6*b* comprises a concatenation of the input history signals/bits HSTi[0] and HSTi[1].

Further, the translation methodology module 104 is configured to receive one or more output history signals/bits HSTo[k] that forms an output history vector signal HSTo (e.g., the HSTo 614 in FIG. 6*b*) from the one or more reactive components, respectively. In some embodiments, HSTo[k] comprises an internal state of a respective reactive component at a specific simulation time. In some embodiments, the output history vector signal HSTo comprises a concatenation of one or more output history signals/bits HSTo[k], wherein each output history signal/bit HSTo[k] is indicative of the histories/internal state of a respective reactive component at the specific simulation time. As can be seen in FIG. 6*a* and FIG. 6*b*, the translation methodology module 104 is configured to receive the output history signal HSTo[0] from the component module 602 and the output history signal HSTo[1] from the component module 604. In some embodiments, the output history vector signal HSTo 614 in FIG. 6*a* and FIG. 6*b* comprises a concatenation of the output history signals/bits HSTo[0] and HSTo[1].

In some embodiments, the reactive components within the digital model include a history input port configured to receive a corresponding input history signal/bit HSTi[k] from the translation methodology module 104. Further, the reactive components within the digital model include a history output port configured to provide a corresponding output history signal/bit HSTo[k] to the translation methodology module 104. In some embodiments, the translation methodology module 104 is configured to provide the input history vector signal HSTi to the one or more reactive components of the digital model, prior to determining the set of closed loop (CL) values associated with the digital model (or prior to the execution of the non-linear CL value determination algorithm 700 in FIG. 7). Further, the input history vector signal HSTi is latched while the CL values are determined based on the non-linear CL value determination algorithm 700 in FIG. 7.

Upon determination of the set of CL values (or upon completion of the execution of the non-linear CL value determination algorithm 700 in FIG. 7), in some embodiments, the translation methodology module 104 is configured to update the input history vector signal HSTi (e.g., the HSTi 612 in FIG. 6*b*) based on an output history vector signal HSTo (e.g., the HSTo 614 in FIG. 6*b*). In other words, the translation methodology module 104 is configured to pass on the HSTo signal received from the one or more reactive components as the HSTi signal to the one or more reactive components, once the set of CL values for the digital model are determined. In some embodiments, the HSTi is updated with the HSTo in order to insert correct history for the one or more reactive components. In some embodiments, updating the input history vector signal HSTi based on an output history vector signal HSTo corresponds to updating the one or more input history signals/bits HSTi [k] with the one or more corresponding output history signals/bits HSTo[k]. In some embodiments, the translation methodology module 104 is configured to update the input history vector signal HSTi based on an output history vector signal HSTo in the same timeslot or delta cycle during which the set of CL values associated with the digital model are determined (or in the same timeslot or delta cycle during which the non-linear CL value determination algorithm 700 in FIG. 7 is executed).

Figure 8:
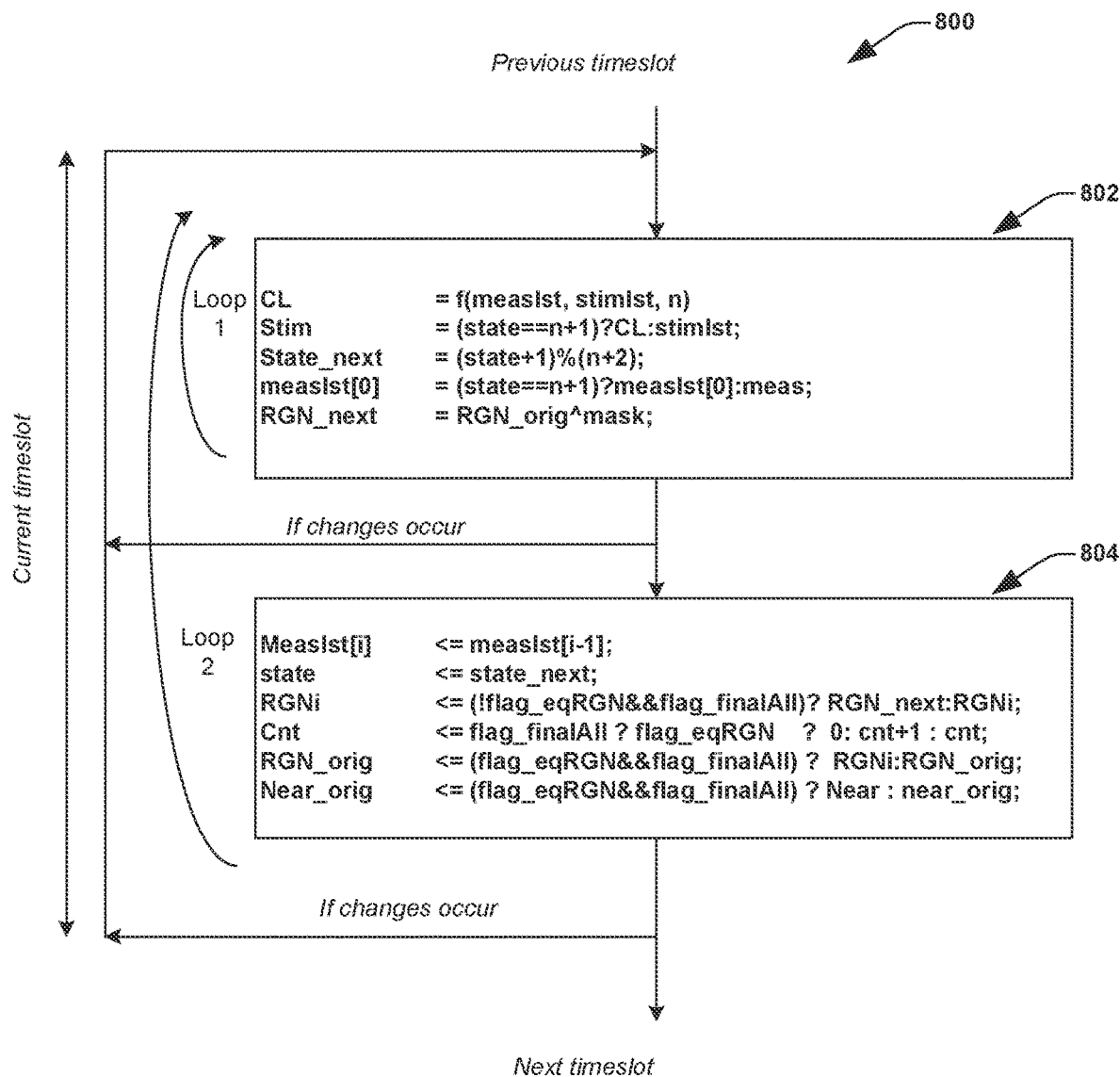
FIG. 8 depicts the method for closed loop result implementation for a digital model with non-linear characteristic, using the event scheduler of Verilog or System Verilog, according to one embodiment of the disclosure.

In some embodiments, a method for CL result implementation that includes the determination of the set of CL values (based on the executing the non-linear CL value determination algorithm 700), providing the determined set of CL values to the input break points of the zero-delay loops and updating the input history signal HSTi, is performed by the translation methodology module 104, within the same timeslot or delta cycle, using the internal event scheduler of Verilog or System Verilog, as illustrated in FIG. 8. In particular, FIG. 8 depicts the method 800 for closed loop result implementation for a digital model with non-linear characteristic, using the internal event scheduler of Verilog or System Verilog, according to one embodiment of the disclosure. In some embodiments, the method 800 is implemented within the translation methodology module 104 in FIG. 1. In some embodiments, the instructions for implementing the method 800 for the closed loop result implementation are ordered in two event regions, the active region 802 and the non-blocking assignment (NBA) region 804 (e.g., the active region and the NBA region specified in the Verilog IEEE standard). In some embodiments, the active region 802 and the NBA region 804 are executed by the internal event scheduler using two internal loops, Loop1 and Loop2, the execution of which are completed in a single timeslot or delta cycle. In some embodiments, all the variables that are calculated instantly are put on the ACTIVE region 802 and all variables that has memory are put on the NBA region 804.

Initially, the method 800 starts with an initial RGNi. In some embodiments, the initial RGNi is chosen using a region search algorithm. RGN_orig corresponds to a previous correct region during the execution of the method 800 (or when the calculations associated with the method 800 are performed). In some embodiments, the previous correct region corresponds to a correct operating region (e.g., of the digital model) at the beginning of the execution of the method 800 (e.g., at the beginning of the timeslot during which the method 800 is executed). Signal mask is a vector of bits which will be applied on current correct region (RGN_orig) finds the next region RGN_next which describe circuit behavior. A region-specific set of closed loop (CL) values for the region RGNi is computed in the Active region 802 using the signal CL, using same steps as explained above with respect to FIG. 5. The signal CL contains correct value of the region-specific set of CL values after all stimuli sets needed are inserted at loops inputs (or input break points). The signal state corresponds to the number of stimuli sets. The signal state_next is used for stopping CL calculation when CL has reached correct value (when calculation is finished, signal state_next contains the value n+1, where n is the number of loops). Each time the active region 802 is executed, a new stimuli is applied and corresponding measured value(s), measlst[0] are determined. In the NBA loop 804, first column of measlst matrix receives measured values every time when a new set of stimuli is applied (or the active region is executed) and all the other columns are shifted to the right. In the NBA region 804, the signal state is further updated with the value of state_next. Every time the value of the signal state is changed, active region 802 is re-executed (a new set of stimuli is applied).

Signal near_orig contains the distances between previous correct region and adjacent regions during the execution of the method 800 (or when the calculations associated with the method 800 are performed). Also, two additional flags are needed: flag_finalAll indicates when closed loop result is successfully calculated and flag_eqRGN identifies when the current operating region (i.e., RGNi) is the correct region. Signal RGNi receives RGN_next only if current operating region is not correct and all closed loop results are calculated successfully. Every time the RGNi is updated, the active region 802 and the NBA region 804 are re-executed in order to determine a corresponding region-specific set of CL values. Signal cnt resets when all calculations (closed loop and correct region) are finished and the signal cnt increments when current operating region is not correct. When all calculations are done, RGN_orig updates with current correct region (i.e., RGNi) and near_orig will now point out to distance of adjacent regions of current correct region. All instructions used for calculating closed loop results and finding correct operating region are executed in a time slot. In some embodiments, after all the calculations are done (i.e., the CL vales are computed and the correct operating region is determined), the input history vector signal HSTi is updated based on an output history vector signal HSTo within the NBA region 804.

Figure 9:
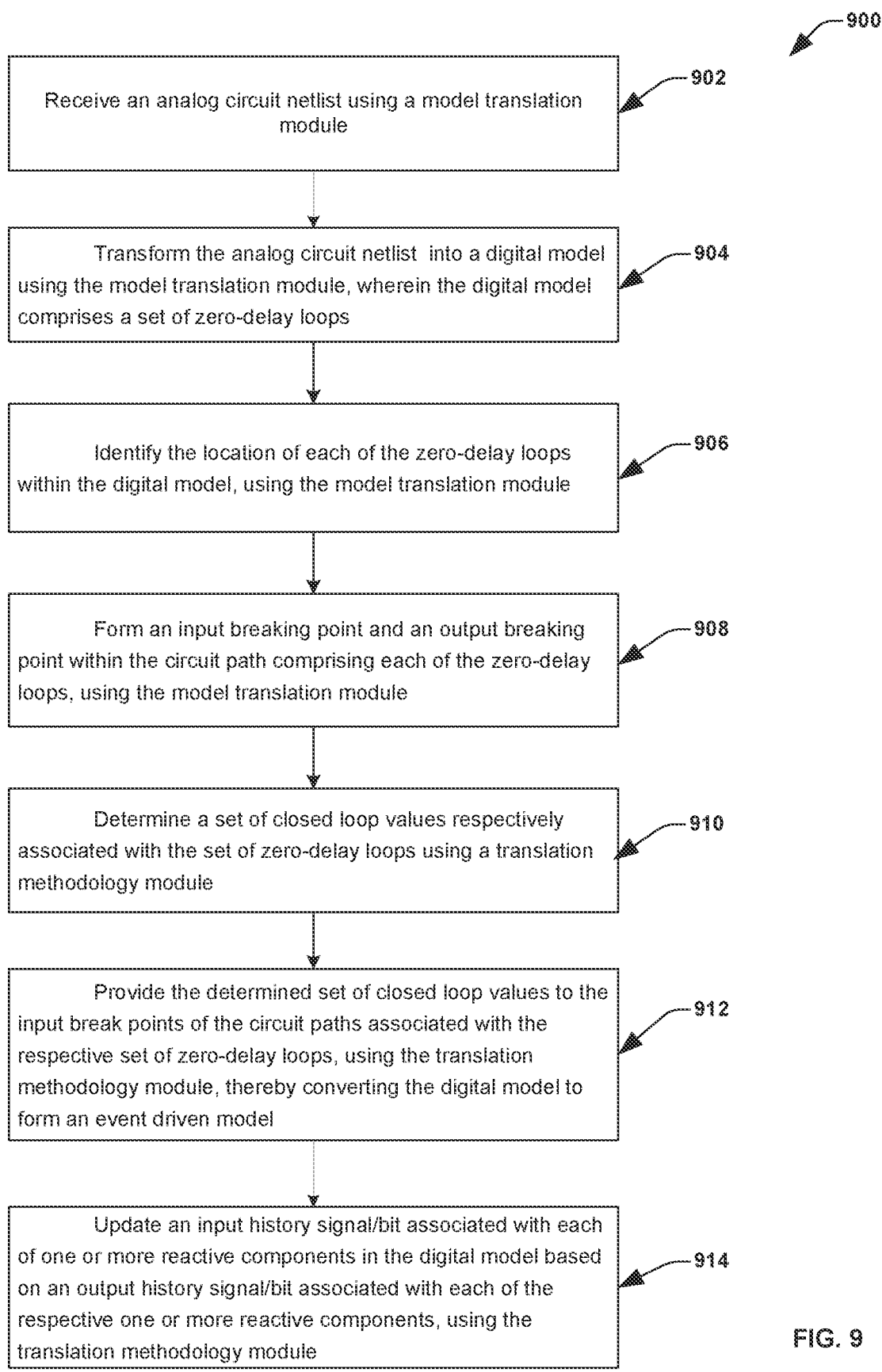
FIG. 9 illustrates a flow chart of a method of an analog circuit netlist translation system, according to one embodiment of the disclosure.

FIG. 9 illustrates a flow chart of a method 900 of an analog circuit netlist translation system, according to one embodiment of the disclosure. In some embodiments, the method 900 may be implemented within the analog circuit netlist translation system 100 in FIG. 1. At 902, an analog circuit netlist (e.g., the analog circuit netlist 202 in FIG. 2*a*) is received at a model translation module (e.g., the model translation module 102 in FIG. 1). At 904, the analog circuit netlist is transformed into a digital model (e.g., the digital model 210 in FIG. 2*b* or the digital model 300 in FIG. 3*a*) comprising a set of zero-delay loops (e.g., N zero-delay loops in FIG. 3*a*) using the model translation module. At 906, location of each of the zero-delay loops are identified within the digital model, using the model translation module. At 908, an input breaking point (e.g., the input breaking point 222*a* in FIG. 2*c*) and an output breaking point (e.g., the output breaking point 222*b* in FIG. 2*c*) is formed within the circuit path comprising each of the zero-delay loops, using the model translation module.

At 910, a set of closed loop values respectively associated with the set of zero-delay loops are determined using a translation methodology module (e.g., the translation methodology module 104 in FIG. 1), in order to eliminate the set of zero-delay loops within the digital model. In some embodiments, the set of closed loop values are determined by the translation methodology module in a single timeslot. In some embodiments, the translation methodology module is configured to determine the set of closed loop values based on input stimuli values provided at input break points of circuit paths associated with the set of zero-delay loops and output measurement values determined based on measurements from output break points of the circuit paths, wherein the output measurement values are measured in response to providing the input stimuli values, as explained in the embodiments above. In some embodiments, when the digital model comprises only linear components (e.g., the digital model 300 and 320 in FIG. 3a and FIG. 3b, respectively), the translation methodology module is configured to determine the set of closed loop values by executing the linear CL value determination algorithm 400 in FIG. 4. Alternately, when the digital model comprises one or more non-linear components (e.g., the digital model 600 and 620 in FIG. 6a and FIG. 6b, respectively), the translation methodology module is configured to determine the set of closed loop values by executing the non-linear CL value determination algorithm 700 in FIG. 7.

At 912, the determined set of closed loop values are provided to the input break points of the circuit paths associated with the respective set of zero-delay loops, thereby converting the digital model to form an event driven model. In some embodiments, the translation methodology module is configured to provide the determined set of closed loop values to the input break points of the circuit paths associated with the respective set of zero-delay loops within the same single timeslot during which the set of closed loop values are determined (or the act 910 is executed). At 914, when the analog circuit netlist (or the corresponding digital model) comprises one or more reactive components, an input history signal/bit HSTi[k] associated with each of the one or more reactive components in the digital model is updated based on an output history signal/bit HSTo[k] associated with each of the respective one or more reactive components, using the translation methodology module. In some embodiments, the input history signal/bit HSTi[k] associated with each of the one or more reactive components is updated by the translation methodology module after the set of closed loop values respectively associated with the set of zero-delay loops are determined. In some embodiments, the translation methodology module is configured to update the input history signal/bit HSTi[k] associated with each of the one or more reactive components in the digital model within the same single timeslot during which the set of closed loop values are determined (or the act 910 is executed). In some embodiments, the above method 900 may be implemented based on the execution of instructions stored in a computer-readable storage medium within the analog circuit netlist translation system.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an analog circuit netlist translation system, comprising a model translation module configured to receive an analog circuit netlist; and transform the analog circuit netlist into a digital model, wherein the digital model comprises a set of zero-delay loops; and a translation methodology module configured to determine a set of closed loop values respectively associated with the set of zero-delay loops, in order to eliminate the set of zero-delay loops within the digital model; wherein the set of closed loop values are determined by the translation methodology module in a single timeslot.

Example 2 is an analog circuit netlist translation system, including the subject matter of example 1, wherein the translation methodology module is configured to determine the set of closed loop values based on input stimuli values provided at input break points of circuit paths associated with the set of zero-delay loops and output measurement values determined based on measurements from output break points of the circuit paths, wherein the output measurement values are determined in response to providing the input stimuli values.

Example 3 is an analog circuit netlist translation system, including the subject matter of examples 1-2, including or omitting elements, wherein the translation methodology module is further configured to provide the determined set of closed loop values to the input break points of the circuit paths associated with the respective set of zero-delay loops, thereby converting the digital model to form an event driven model.

Example 4 is an analog circuit netlist translation system, including the subject matter of examples 1-3, including or omitting elements, wherein the translation methodology module is configured to provide the determined set of closed loop values to the input break points of the circuit paths associated with the respective set of zero-delay loops within the same single timeslot during which the set of closed loop values are determined.

Example 5 is an analog circuit netlist translation system, including the subject matter of examples 1-4, including or omitting elements, wherein the input stimuli values comprises a plurality of stimuli sets provided to the set of zero-delay loops, each stimuli set of the plurality of stimuli sets comprising a set of stimulus values provided to the input break points of the circuit paths associated with the set of zero delay loops, respectively and wherein the output measurement values comprises a respective plurality of measured value sets determined from the set of zero-delay loops in response to providing the plurality of stimuli sets, each measured value set of the plurality of measured value sets comprising a set of measured output values determined based on measurements from the output break points of the circuit paths associated with the set of zero delay loops, respectively.

Example 6 is an analog circuit netlist translation system, including the subject matter of examples 1-5, including or omitting elements, wherein each measured output value within the set of measured output values comprises a difference between a response value measured at an output break point of a respective zero-delay loop in response to providing the stimulus value at a corresponding input breakpoint and the stimulus value provided at the input break point.

Example 7 is an analog circuit netlist translation system, including the subject matter of examples 1-6, including or omitting elements, wherein each stimuli set of the plurality of stimuli sets are provided sequentially to the input break points of the circuit paths associated with the set of zero delay loops and wherein each measured value set of the plurality of measured value sets are determined sequentially from the output break points of the circuit paths associated with the set of zero delay loops, in response to providing the respective stimuli set.

Example 8 is an analog circuit netlist translation system, including the subject matter of examples 1-7, including or omitting elements, wherein a number of stimuli sets within the plurality of stimuli sets is equal to one greater than a number of zero-delay loops in the set of zero-delay loops associated with the digital model.

Example 9 is an analog circuit netlist translation system, including the subject matter of examples 1-8, including or omitting elements, wherein, when the digital model comprises only linear components, the determination of the set of closed loop values by the translation methodology module comprises providing the input stimuli values at the input break points of the circuit paths associated with the set of zero-delay loops; determining the output measurement values based on measurements from the output break points of the circuit paths, in response to providing the input stimuli values at the input break points of circuit paths; and computing the set of closed loop values using the input stimuli values and the output measurement values, in accordance with a predefined closed loop (CL) value relation.

Example 10 is an analog circuit netlist translation system, including the subject matter of examples 1-9, including or omitting elements, wherein, when the digital model comprises one or more nonlinear components, the determination of the set of closed loop values by the translation methodology module comprises determining one or more region specific sets of closed loop values corresponding to one or more operating regions of digital model, until a region specific set of closed loop values associated with a correct operating region of the one or more operating regions of the digital model is determined, wherein the set of closed loop values correspond to the region specific set of closed loop values that is associated with the correct operating region.

Example 11 is an analog circuit netlist translation system, including the subject matter of examples 1-10, including or omitting elements, wherein, in order to determine each region-specific set of closed loop values of the one or more region specific sets of closed loop values, the translation methodology module is configured to provide one or more input region signals that forms an input region vector signal to region input points of the one or more nonlinear components respectively, wherein the input region vector signal defines an operating region of the one or more operating regions of the analog circuit netlist; provide the input stimuli values at the input break points of circuit paths associated with the set of zero-delay loops; determining the output measurement values based on measurements from the output break points of the circuit paths, in response to providing the input stimuli values at the input break points of circuit paths; and computing a region-specific set of closed loop values based on the input stimuli values and the output measurement values, in accordance with a predefined closed loop value relation.

Example 12 is an analog circuit netlist translation system, including the subject matter of examples 1-11, including or omitting elements, wherein upon determining each region-specific set of closed loop values, the translation methodology module is configured to determine a subsequent region-specific set of closed loop values of the one or more region specific sets of closed loop values when the corresponding operating region is determined to be not the correct operating region.

Example 13 is an analog circuit netlist translation system, including the subject matter of examples 1-12, including or omitting elements, wherein, when the corresponding operating region is determined to be not the correct operating region, the translation methodology module is configured to determine a subsequent operating region from a predefined set of operating regions, in order to determine the subsequent region-specific set of closed loop values.

Example 14 is an analog circuit netlist translation system, including the subject matter of examples 1-13, including or omitting elements, wherein the translation methodology module is configured to determine if the corresponding operating region is the correct operating region, based on one or more output region signals that forms an output region vector signal, received from region output points of the one or more nonlinear components respectively, after providing the corresponding determined region-specific set of closed loop values at input break points of circuit paths associated with the set of zero-delay loops.

Example 15 is an analog circuit netlist translation system, including the subject matter of examples 1-14, including or omitting elements, wherein the translation methodology module is configured to determine that the corresponding operating region is the correct operating region, when one or more region output signals are same as the one or more region input signals.

Example 16 is an analog circuit netlist translation system, including the subject matter of examples 1-15, including or omitting elements, wherein, when the digital model comprises one or more reactive components, the translation methodology module is configured to update an input history signal/bit associated with each of the one or more reactive components in the digital model based on an output history signal/bit associated with each of the respective one or more reactive components, wherein the input history signal/bit associated with each of the one or more reactive components is updated after the set of closed loop values respectively associated with the set of zero-delay loops are determined.

Example 17 is an analog circuit netlist translation system, including the subject matter of examples 1-16, including or omitting elements, wherein the translation methodology module is configured to update the input history signal/bit associated with each of the one or more reactive components in the digital model within the same single timeslot during which the set of closed loop values are determined.

Example 18 is a computer-readable storage medium comprising a set of instructions that, in response to being executed on an analog circuit netlist translation system, cause the analog circuit netlist translation system to perform operations comprising receiving an analog circuit netlist; transforming the analog circuit netlist into a digital model, wherein the digital model comprises a set of zero-delay loops; and determining a set of closed loop values respectively associated with the set of zero-delay loops, in order to eliminate the set of zero-delay loops within the digital model; wherein the set of closed loop values are determined in a single timeslot.

Example 19 is a computer-readable storage medium, including the subject matter of example 18, wherein the set of closed loop values are determined based on input stimuli values provided at input break points of circuit paths associated with the set of zero-delay loops and output measurement values determined based on measurements from output break points of the circuit paths, wherein the output measurement values are determined in response to providing the input stimuli values.

Example 20 is a computer-readable storage medium, including the subject matter of examples 18-19, including or omitting elements, wherein the operations further comprise providing the determined set of closed loop values to the input break points of the circuit paths associated with the respective set of zero-delay loops, thereby converting the digital model to form an event driven model.

Example 21 is a computer-readable storage medium, including the subject matter of examples 18-20, including or omitting elements, wherein the determined set of closed loop values are provided to the input break points of the circuit paths associated with the respective set of zero-delay loops within the same single timeslot during which the set of closed loop values are determined.

Example 22 is a computer-readable storage medium, including the subject matter of examples 18-21, including or omitting elements, wherein the input stimuli values comprises a plurality of stimuli sets provided to the set of zero-delay loops, each stimuli set of the plurality of stimuli sets comprising a set of stimulus values provided to the input break points of the circuit paths associated with the set of zero delay loops, respectively and wherein the output measurement values comprises a respective plurality of measured value sets determined from the set of zero-delay loops in response to providing the plurality of stimuli sets, each measured value set of the plurality of measured value sets comprising a set of measured output values determined based on measurements from the output break points of the circuit paths associated with the set of zero delay loops, respectively.

Example 23 is a computer-readable storage medium, including the subject matter of examples 18-22, including or omitting elements, wherein each measured output value within the set of measured output values comprises a difference between a response value measured at an output break point of a respective zero-delay loop in response to providing the stimulus value at a corresponding input breakpoint and the stimulus value provided at the input break point.

Example 24 is a computer-readable storage medium, including the subject matter of examples 18-23, including or omitting elements, wherein each stimuli set of the plurality of stimuli sets are provided sequentially to the input break points of the circuit paths associated with the set of zero delay loops and wherein each measured value set of the plurality of measured value sets are determined sequentially from the output break points of the circuit paths associated with the set of zero delay loops, in response to providing the respective stimuli set.

Example 25 is a computer-readable storage medium, including the subject matter of examples 18-24, including or omitting elements, wherein a number of stimuli sets within the plurality of stimuli sets is equal to one greater than a number of zero-delay loops in the set of zero-delay loops associated with the digital model.

Example 26 is a computer-readable storage medium, including the subject matter of examples 18-25, including or omitting elements, wherein, when the digital model comprises only linear components, the determination of the set of closed loop values comprises: providing the input stimuli values at the input break points of the circuit paths associated with the set of zero-delay loops; determining the output measurement values based on measurements from the output break points of the circuit paths, in response to providing the input stimuli values at the input break points of circuit paths; and computing the set of closed loop values using the input stimuli values and the output measurement values, in accordance with a predefined closed loop (CL) value relation.

Example 27 is a computer-readable storage medium, including the subject matter of examples 18-26, including or omitting elements, wherein, when the digital model comprises one or more nonlinear components, the determination of the set of closed loop values comprises determining one or more region specific sets of closed loop values corresponding to one or more operating regions of digital model, until a region specific set of closed loop values associated with a correct operating region of the one or more operating regions of the digital model is determined, wherein the set of closed loop values correspond to the region specific set of closed loop values that is associated with the correct operating region.

Example 28 is a computer-readable storage medium, including the subject matter of examples 18-27, including or omitting elements, wherein, when the digital model comprises one or more reactive components, the operations further comprise updating an input history signal/bit associated with each of the one or more reactive components in the digital model based on an output history signal/bit associated with each of the respective one or more reactive components, wherein the input history signal/bit associated with each of the one or more reactive components is updated after the set of closed loop values respectively associated with the set of zero-delay loops are determined.

Example 29 is a computer-readable storage medium, including the subject matter of examples 18-28, including or omitting elements, wherein the input history signal/bit associated with each of the one or more reactive components in the digital model is updated within the same single timeslot during which the set of closed loop values are determined.

Example 30 is a method for an analog circuit netlist translation system, comprising: receiving an analog circuit netlist model using a model translation module; transforming the analog circuit netlist into a digital model using the model translation module, wherein the digital model comprises a set of zero-delay loops; and determining a set of closed loop values respectively associated with the set of zero-delay loops using a translation methodology module, in order to eliminate the set of zero-delay loops within the digital model; wherein the set of closed loop values are determined by the translation methodology module in a single timeslot.

Example 31 is a method, including the subject matter of example 30, wherein the set of closed loop values are determined by the translation methodology module based on input stimuli values provided at input break points of circuit paths associated with the set of zero-delay loops and output measurement values determined based on measurements from output break points of the circuit paths, wherein the output measurement values are determined in response to providing the input stimuli values.

Example 32 is a method, including the subject matter of examples 30-31, including or omitting elements, wherein the set of closed loop values are determined by the translation methodology module based on input stimuli values provided at input break points of circuit paths associated with the set of zero-delay loops and output measurement values determined based on measurements from output break points of the circuit paths, wherein the output measurement values are determined in response to providing the input stimuli values.

Example 33 is a method, including the subject matter of examples 30-32, including or omitting elements, further comprising providing the determined set of closed loop values to the input break points of the circuit paths associated with the respective set of zero-delay loops, using the translation methodology module, thereby converting the digital model to form an event driven model.

Example 34 is a method, including the subject matter of examples 30-33, including or omitting elements, wherein the determined set of closed loop values are provided to the input break points of the circuit paths associated with the respective set of zero-delay loops, by the translation methodology module, within the same single timeslot during which the set of closed loop values are determined.

Example 35 is a method, including the subject matter of examples 30-34, including or omitting elements, wherein the input stimuli values comprises a plurality of stimuli sets provided to the set of zero-delay loops, each stimuli set of the plurality of stimuli sets comprising a set of stimulus values provided to the input break points of the circuit paths associated with the set of zero delay loops, respectively and wherein the output measurement values comprises a respective plurality of measured value sets determined from the set of zero-delay loops in response to providing the plurality of stimuli sets, each measured value set of the plurality of measured value sets comprising a set of measured output values determined based on measurements from the output break points of the circuit paths associated with the set of zero delay loops, respectively.

Example 36 is a method, including the subject matter of examples 30-35, including or omitting elements, wherein each measured output value within the set of measured output values comprises a difference between a response value measured at an output break point of a respective zero-delay loop in response to providing the stimulus value at a corresponding input breakpoint and the stimulus value provided at the input break point.

Example 37 is a method, including the subject matter of examples 30-36, including or omitting elements, wherein each stimuli set of the plurality of stimuli sets are provided sequentially to the input break points of the circuit paths associated with the set of zero delay loops and wherein each measured value set of the plurality of measured value sets are determined sequentially from the output break points of the circuit paths associated with the set of zero delay loops, in response to providing the respective stimuli set.

Example 38 is a method, including the subject matter of examples 30-37, including or omitting elements, wherein a number of stimuli sets within the plurality of stimuli sets is equal to one greater than a number of zero-delay loops in the set of zero-delay loops associated with the digital model.

Example 39 is a method, including the subject matter of examples 30-38, including or omitting elements, wherein, when the digital model comprises only linear components, the determination of the set of closed loop values by the translation methodology module comprises providing the input stimuli values at the input break points of the circuit paths associated with the set of zero-delay loops; determining the output measurement values based on measurements from the output break points of the circuit paths, in response to providing the input stimuli values at the input break points of circuit paths; and computing the set of closed loop values using the input stimuli values and the output measurement values, in accordance with a predefined closed loop (CL) value relation.

Example 40 is a method, including the subject matter of examples 30-39, including or omitting elements, wherein, when the digital model comprises one or more nonlinear components, the determination of the set of closed loop values by the translation methodology module comprises determining one or more region specific sets of closed loop values corresponding to one or more operating regions of digital model, until a region specific set of closed loop values associated with a correct operating region of the one or more operating regions of the digital model is determined, wherein the set of closed loop values correspond to the region specific set of closed loop values that is associated with the correct operating region.

Example 41 is a method, including the subject matter of examples 30-40, including or omitting elements, wherein, when the digital model comprises one or more reactive components, the method further comprises updating an input history signal/bit associated with each of the one or more reactive components in the digital model based on an output history signal/bit associated with each of the respective one or more reactive components using the translation methodology module, wherein the input history signal/bit associated with each of the one or more reactive components is updated after the set of closed loop values respectively associated with the set of zero-delay loops are determined.

Example 42 is a method, including the subject matter of examples 30-41, including or omitting elements, wherein the input history signal/bit associated with each of the one or more reactive components in the digital model is updated within the same single timeslot during which the set of closed loop values are determined.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:
1. An analog circuit netlist translation system, comprising:
   a model translation module configured to:
      receive an analog circuit netlist; and
      transform the analog circuit netlist into a digital model, wherein the digital model comprises a set of zero-delay loops; and a translation methodology module configured to determine a set of closed loop values respectively associated with the set of zero-delay loops, in order to eliminate the set of zero-delay loops within the digital model;
wherein the set of closed loop values are determined by the translation methodology module in a single timeslot.

2. The analog circuit netlist translation system of claim 1, wherein the translation methodology module is configured to determine the set of closed loop values based on input stimuli values provided at input break points of circuit paths associated with the set of zero-delay loops and output measurement values determined based on measurements from output break points of the circuit paths, wherein the output measurement values are determined in response to providing the input stimuli values.

3. The analog circuit netlist translation system of claim 2, wherein the translation methodology module is further configured to provide the set of closed loop values to the input break points of the circuit paths associated with the set of zero-delay loops, respectively, thereby converting the digital model to form an event driven model.

4. The analog circuit netlist translation system of claim 3, wherein the translation methodology module is configured to provide the set of closed loop values to the input break points of the circuit paths associated with the set of zero-delay loops, respectively, within a same single timeslot during which the set of closed loop values are determined.

5. The analog circuit netlist translation system of claim 2, wherein the input stimuli values comprise a plurality of stimuli sets provided to the set of zero-delay loops, each stimuli set of the plurality of stimuli sets comprising a set of stimulus values provided to the input break points of the circuit paths associated with the set of zero-delay loops, respectively and wherein the output measurement values comprise a plurality of measured value sets respectively determined from the set of zero-delay loops in response to providing the plurality of stimuli sets, each measured value set of the plurality of measured value sets comprising a set of measured output values determined based on measurements from the output break points of the circuit paths associated with the set of zero-delay loops, respectively.

6. The analog circuit netlist translation system of claim 5, wherein each measured output value within the set of measured output values comprises a difference between a response value measured at an output break point of a respective zero-delay loop in response to providing a respective stimulus value at a corresponding input breakpoint and the respective stimulus value provided at the input break point.

7. The analog circuit netlist translation system of claim 5, wherein each stimuli set of the plurality of stimuli sets are provided sequentially to the input break points of the circuit paths associated with the set of zero-delay loops and wherein each measured value set of the plurality of measured value sets are determined sequentially from the output break points of the circuit paths associated with the set of zero-delay loops, in response to providing a respective stimuli set.

8. The analog circuit netlist translation system of claim 5, wherein a number of stimuli sets within the plurality of stimuli sets is equal to one greater than a number of zero-delay loops in the set of zero-delay loops associated with the digital model.

9. The analog circuit netlist translation system of claim 2, wherein, when the digital model comprises only linear components, the set of closed loop values are determined by the translation methodology module by:
providing the input stimuli values at the input break points of the circuit paths associated with the set of zero-delay loops;
determining the output measurement values based on measurements from the output break points of the circuit paths, in response to providing the input stimuli values at the input break points of the circuit paths; and
computing the set of closed loop values using the input stimuli values and the output measurement values, in accordance with a predefined closed loop (CL) value relation.

10. The analog circuit netlist translation system of claim 2, wherein, when the digital model comprises one or more nonlinear components, the set of closed loop values are determined by the translation methodology module by determining one or more region specific sets of closed loop values corresponding to one or more operating regions of digital model, until a region specific set of closed loop values associated with a correct operating region of the one or more operating regions of the digital model is determined, wherein the set of closed loop values correspond to the region specific set of closed loop values that is associated with the correct operating region.

11. The analog circuit netlist translation system of claim 1, wherein, when the digital model comprises one or more reactive components, the translation methodology module is configured to update an input history signal/bit associated with each of the one or more reactive components in the digital model based on an output history signal/bit associated with each of the one or more reactive components, respectively, wherein the input history signal/bit associated with each of the one or more reactive components is updated after the set of closed loop values respectively associated with the set of zero-delay loops are determined.

12. The analog circuit netlist translation system of claim 11, wherein the translation methodology module is configured to update the input history signal/bit associated with each of the one or more reactive components in the digital model within a same single timeslot during which the set of closed loop values are determined.

13. At least one computer-readable storage medium comprising a set of instructions that, in response to being executed on an analog circuit netlist translation system, cause the analog circuit netlist translation system to perform operations comprising:
receiving an analog circuit netlist;
transforming the analog circuit netlist into a digital model, wherein the digital model comprises a set of zero-delay loops; and
determining a set of closed loop values respectively associated with the set of zero-delay loops, in order to eliminate the set of zero-delay loops within the digital model;
wherein the set of closed loop values are determined in a single timeslot.

14. The at least one computer-readable storage medium of claim 13, wherein the set of closed loop values are determined based on input stimuli values provided at input break points of circuit paths associated with the set of zero-delay loops and output measurement values determined based on measurements from output break points of the circuit paths, wherein the output measurement values are determined in response to providing the input stimuli values.

15. The at least one computer-readable storage medium of claim 14, wherein the operations further comprise providing the set of closed loop values to the input break points of the circuit paths associated with the set of zero-delay loops, respectively, thereby converting the digital model to form an event driven model.

16. The at least one computer-readable storage medium of claim 15, wherein the set of closed loop values are provided to the input break points of the circuit paths associated with the set of zero-delay loops, respectively, within a same single timeslot during which the set of closed loop values are determined.

17. A method for an analog circuit netlist translation system, comprising:
  receiving an analog circuit netlist using a model translation module;
  transforming the analog circuit netlist into a digital model using the model translation module, wherein the digital model comprises a set of zero-delay loops; and
  determining a set of closed loop values respectively associated with the set of zero-delay loops using a translation methodology module, in order to eliminate the set of zero-delay loops within the digital model;
  wherein the set of closed loop values are determined by the translation methodology module in a single timeslot.

18. The method of claim 17, wherein the set of closed loop values are determined by the translation methodology module based on input stimuli values provided at input break points of circuit paths associated with the set of zero-delay loops and output measurement values determined based on measurements from output break points of the circuit paths, wherein the output measurement values are determined in response to providing the input stimuli values.

19. The method of claim 18, further comprising providing the set of closed loop values to the input break points of the circuit paths associated with the set of zero-delay loops, respectively, using the translation methodology module, thereby converting the digital model to form an event driven model.

20. The method of claim 19, wherein the set of closed loop values are provided to the input break points of the circuit paths associated with the set of zero-delay loops, respectively, by the translation methodology module, within a same single timeslot during which the set of closed loop values are determined.

* * * * *